(12) United States Patent
Knudsen

(10) Patent No.: US 9,688,200 B2
(45) Date of Patent: Jun. 27, 2017

(54) CALIBRATION SYSTEM AND METHOD FOR MULTI-CAMERA VISION SYSTEM

(71) Applicant: MAGNA ELECTRONICS INC., Auburn Hills, MI (US)

(72) Inventor: Timor Knudsen, Freising (DE)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 499 days.

(21) Appl. No.: 14/195,135

(22) Filed: Mar. 3, 2014

(65) Prior Publication Data

US 2014/0247354 A1 Sep. 4, 2014

Related U.S. Application Data

(60) Provisional application No. 61/772,014, filed on Mar. 4, 2013.

(51) Int. Cl.
| | |
|---|---|
| *G06T 7/00* | (2017.01) |
| *B60R 1/00* | (2006.01) |
| *G06T 7/80* | (2017.01) |

(52) U.S. Cl.
CPC .............. *B60R 1/00* (2013.01); *G06T 7/85* (2017.01); *B60R 2300/105* (2013.01);
(Continued)

(58) Field of Classification Search
CPC ... G11B 27/30; G11B 27/031; G11B 27/3027; G11B 2220/90; G11B 2220/218;
(Continued)

(56) References Cited

U.S. PATENT DOCUMENTS

| | | | |
|---|---|---|---|
| 4,970,653 A | 11/1990 | Kenue | |
| 5,166,681 A | 11/1992 | Bottesch et al. | |

(Continued)

FOREIGN PATENT DOCUMENTS

| | | |
|---|---|---|
| EP | 0361914 | 2/1993 |
| EP | 0640903 | 3/1995 |

(Continued)

OTHER PUBLICATIONS

Tsai "A Versatile Camera Calibration Techniaue for High-Accuracy 3D Machine Vision Metrology Using Off-the-shelf TV Cameras and Lenses," IEEE Journal of Robotics and Automation, vol. RA-3, No. 4, Aug. 1987.*

(Continued)

*Primary Examiner* — Frank Huang
(74) *Attorney, Agent, or Firm* — Gardner, Linn, Burkhart & Flory, LLP

(57) ABSTRACT

A calibration system for a multi-camera vision system of a vehicle includes a plurality of calibration targets disposed at an area at which the vehicle is positioned for a calibrating procedure. The calibration targets may include a patterned array of markings, such as colored or black/white or shaded markings or dots, disposed at forward, rearward and/or sideward regions of the vehicle. The control is operable to process image data captured by the cameras and, responsive to processing of captured image data, the control is operable to determine a particular local pattern of markings of the respective calibration target to determine the position of the respective calibration target relative to the camera that is imaging that target. Responsive to processing of captured image data, the calibration system is operable to calibrate the multi-camera vision system of the vehicle.

20 Claims, 12 Drawing Sheets

(52) U.S. Cl.
CPC ............... *B60R 2300/402* (2013.01); *G06T 2207/10012* (2013.01); *G06T 2207/30208* (2013.01); *G06T 2207/30252* (2013.01)

(58) Field of Classification Search
CPC ...... G11B 2220/2562; G11B 2220/216; G11B 27/105; H04N 13/04; H04N 9/8205; H04N 13/0003; H04N 13/0055; H04N 19/597
See application file for complete search history.

(56) References Cited

U.S. PATENT DOCUMENTS

| | | |
|---|---|---|
| 5,204,778 A | 4/1993 | Bechtel |
| 5,208,701 A | 5/1993 | Maeda |
| 5,208,750 A | 5/1993 | Kurami et al. |
| 5,214,408 A | 5/1993 | Asayama |
| 5,243,524 A | 9/1993 | Ishida et al. |
| 5,245,422 A | 9/1993 | Borcherts et al. |
| 5,276,389 A | 1/1994 | Levers |
| 5,289,321 A | 2/1994 | Secor |
| 5,305,012 A | 4/1994 | Faris |
| 5,307,136 A | 4/1994 | Saneyoshi |
| 5,351,044 A | 9/1994 | Mathur et al. |
| 5,355,118 A | 10/1994 | Fukuhara |
| 5,386,285 A | 1/1995 | Asayama |
| 5,406,395 A | 4/1995 | Wilson et al. |
| 5,408,346 A | 4/1995 | Trissel et al. |
| 5,414,461 A | 5/1995 | Kishi et al. |
| 5,426,294 A | 6/1995 | Kobayashi et al. |
| 5,430,431 A | 7/1995 | Nelson |
| 5,434,407 A | 7/1995 | Bauer et al. |
| 5,440,428 A | 8/1995 | Hegg et al. |
| 5,444,478 A | 8/1995 | Lelong et al. |
| 5,451,822 A | 9/1995 | Bechtel et al. |
| 5,469,298 A | 11/1995 | Suman et al. |
| 5,530,420 A | 6/1996 | Tsuchiya et al. |
| 5,535,144 A | 7/1996 | Kise |
| 5,550,677 A | 8/1996 | Schofield et al. |
| 5,555,555 A | 9/1996 | Sato et al. |
| 5,568,027 A | 10/1996 | Teder |
| 5,648,835 A | 7/1997 | Uzawa |
| 5,661,303 A | 8/1997 | Teder |
| 5,670,935 A | 9/1997 | Schofield et al. |
| 5,760,826 A | 6/1998 | Nayar |
| 5,760,962 A | 6/1998 | Schofield et al. |
| 5,761,094 A | 6/1998 | Olson et al. |
| 5,765,116 A | 6/1998 | Wilson-Jones et al. |
| 5,796,094 A | 8/1998 | Schofield et al. |
| 5,850,176 A | 12/1998 | Kinoshita et al. |
| 5,850,254 A | 12/1998 | Takano et al. |
| 5,867,591 A | 2/1999 | Onda |
| 5,877,707 A | 3/1999 | Kowalick |
| 5,877,897 A | 3/1999 | Schofield et al. |
| 5,878,370 A | 3/1999 | Olson |
| 5,896,085 A | 4/1999 | Mori et al. |
| 5,920,367 A | 7/1999 | Kajimoto et al. |
| 5,923,027 A | 7/1999 | Stam et al. |
| 6,049,171 A | 4/2000 | Stam et al. |
| 6,052,124 A | 4/2000 | Stein et al. |
| 6,084,519 A | 7/2000 | Coulling et al. |
| 6,091,833 A | 7/2000 | Yasui et al. |
| 6,097,024 A | 8/2000 | Stam et al. |
| 6,100,811 A | 8/2000 | Hsu et al. |
| 6,175,300 B1 | 1/2001 | Kendrick |
| 6,226,061 B1 | 5/2001 | Tagusa |
| 6,259,423 B1 | 7/2001 | Tokito et al. |
| 6,266,082 B1 | 7/2001 | Yonezawa et al. |
| 6,266,442 B1 | 7/2001 | Laumeyer et al. |
| 6,285,393 B1* | 9/2001 | Shimoura ............ G05D 1/0246 348/119 |
| 6,285,778 B1 | 9/2001 | Nakajima et al. |
| 6,297,781 B1 | 10/2001 | Turnbull et al. |
| 6,310,611 B1 | 10/2001 | Caldwell |
| 6,317,057 B1 | 11/2001 | Lee |
| 6,320,282 B1 | 11/2001 | Caldwell |
| 6,370,329 B1 | 4/2002 | Teuchert |
| 6,424,273 B1 | 7/2002 | Gutta et al. |
| 6,553,130 B1 | 4/2003 | Lemelson et al. |
| 6,563,532 B1* | 5/2003 | Strub ................ G11B 27/031 348/158 |
| 6,570,998 B1 | 5/2003 | Ohtsuka et al. |
| 6,574,033 B1 | 6/2003 | Chui et al. |
| 6,578,017 B1 | 6/2003 | Ebersole et al. |
| 6,587,573 B1 | 7/2003 | Stam et al. |
| 6,589,625 B1 | 7/2003 | Kothari et al. |
| 6,593,011 B2 | 7/2003 | Liu et al. |
| 6,593,698 B2 | 7/2003 | Stam et al. |
| 6,594,583 B2 | 7/2003 | Ogura et al. |
| 6,611,610 B1 | 8/2003 | Stam et al. |
| 6,631,316 B2 | 10/2003 | Stam et al. |
| 6,631,994 B2 | 10/2003 | Suzuki et al. |
| 6,636,258 B2 | 10/2003 | Strumolo |
| 6,678,056 B2 | 1/2004 | Downs |
| 6,690,268 B2 | 2/2004 | Schofield et al. |
| 6,700,605 B1 | 3/2004 | Toyoda et al. |
| 6,704,621 B1 | 3/2004 | Stein et al. |
| 6,711,474 B1 | 3/2004 | Treyz et al. |
| 6,714,331 B2 | 3/2004 | Lewis et al. |
| 6,735,506 B2 | 5/2004 | Breed et al. |
| 6,744,353 B2 | 6/2004 | Sjönell |
| 6,795,221 B1 | 9/2004 | Urey |
| 6,823,241 B2 | 11/2004 | Shirato et al. |
| 6,864,930 B2 | 3/2005 | Matsushita et al. |
| 6,882,287 B2 | 4/2005 | Schofield |
| 6,889,161 B2 | 5/2005 | Winner et al. |
| 6,909,753 B2 | 6/2005 | Meehan et al. |
| 6,968,736 B2 | 11/2005 | Lynam |
| 6,975,775 B2 | 12/2005 | Rykowski et al. |
| 7,038,577 B2 | 5/2006 | Pawlicki et al. |
| 7,085,637 B2 | 8/2006 | Breed et al. |
| 7,092,548 B2 | 8/2006 | Laumeyer et al. |
| 7,113,867 B1 | 9/2006 | Stein |
| 7,116,246 B2 | 10/2006 | Winter et al. |
| 7,149,613 B2 | 12/2006 | Stam et al. |
| 7,151,996 B2 | 12/2006 | Stein |
| 7,227,611 B2 | 6/2007 | Hull et al. |
| 7,325,934 B2 | 2/2008 | Schofield et al. |
| 7,325,935 B2 | 2/2008 | Schofield et al. |
| 7,338,177 B2 | 3/2008 | Lynam |
| 7,375,803 B1 | 5/2008 | Bamji |
| 7,565,006 B2 | 7/2009 | Stam et al. |
| 7,566,851 B2 | 7/2009 | Stein et al. |
| 7,619,508 B2 | 11/2009 | Lynam et al. |
| 7,720,580 B2 | 5/2010 | Higgins-Luthman |
| 7,786,898 B2 | 8/2010 | Stein et al. |
| 7,792,329 B2 | 9/2010 | Schofield et al. |
| 7,843,451 B2 | 11/2010 | Lafon |
| 7,881,496 B2 | 2/2011 | Camilleri |
| 7,914,187 B2 | 3/2011 | Higgins-Luthman et al. |
| 7,949,486 B2 | 5/2011 | Denny et al. |
| 8,009,188 B2* | 8/2011 | Sugahara ............ G11B 27/105 348/128 |
| 8,017,898 B2 | 9/2011 | Lu et al. |
| 8,064,643 B2 | 11/2011 | Stein et al. |
| 8,082,101 B2 | 12/2011 | Stein et al. |
| 8,100,568 B2 | 1/2012 | DeLine et al. |
| 8,164,628 B2 | 4/2012 | Stein et al. |
| 8,224,031 B2 | 7/2012 | Saito |
| 8,233,045 B2 | 7/2012 | Luo et al. |
| 8,254,635 B2 | 8/2012 | Stein et al. |
| 8,300,886 B2 | 10/2012 | Hoffmann |
| 8,378,851 B2 | 2/2013 | Stein et al. |
| 8,421,865 B2 | 4/2013 | Euler et al. |
| 8,452,055 B2 | 5/2013 | Stein et al. |
| 8,534,887 B2 | 9/2013 | DeLine et al. |
| 8,553,088 B2 | 10/2013 | Stein et al. |
| 2002/0005778 A1 | 1/2002 | Breed |
| 2002/0011611 A1 | 1/2002 | Huang et al. |
| 2002/0113873 A1 | 8/2002 | Williams |
| 2003/0103142 A1 | 6/2003 | Hitomi et al. |
| 2003/0137586 A1 | 7/2003 | Lewellen |
| 2003/0222982 A1 | 12/2003 | Hamdan et al. |
| 2004/0164228 A1 | 8/2004 | Fogg et al. |

(56) References Cited

U.S. PATENT DOCUMENTS

| | | |
|---|---|---|
| 2005/0219852 A1 | 10/2005 | Stam et al. |
| 2005/0237385 A1 | 10/2005 | Kosaka et al. |
| 2006/0103727 A1 | 5/2006 | Tseng |
| 2006/0250501 A1 | 11/2006 | Widmann et al. |
| 2007/0024724 A1 | 2/2007 | Stein et al. |
| 2007/0088474 A1* | 4/2007 | Sugiura ............ B60R 1/00 701/36 |
| 2007/0104476 A1 | 5/2007 | Yasutomi et al. |
| 2007/0115357 A1* | 5/2007 | Stein ............ B60Q 1/0023 348/148 |
| 2007/0242339 A1 | 10/2007 | Bradley |
| 2008/0043099 A1 | 2/2008 | Stein et al. |
| 2008/0144924 A1* | 6/2008 | Hoffmann ............ G06T 7/002 382/154 |
| 2008/0147321 A1 | 6/2008 | Howard et al. |
| 2008/0266396 A1 | 10/2008 | Stein |
| 2009/0113509 A1 | 4/2009 | Tseng et al. |
| 2009/0160940 A1* | 6/2009 | Imamura ............ H04N 7/181 348/159 |
| 2009/0174773 A1* | 7/2009 | Gowdy ............ B60R 1/00 348/148 |
| 2009/0290032 A1 | 11/2009 | Zhang et al. |
| 2010/0020170 A1 | 1/2010 | Higgins-Luthman et al. |
| 2011/0216201 A1* | 9/2011 | McAndrew ............ G06T 7/0018 348/148 |
| 2011/0279673 A1* | 11/2011 | Teich ............ B63B 49/00 348/148 |
| 2012/0045112 A1 | 2/2012 | Lundblad et al. |
| 2012/0062743 A1 | 3/2012 | Lynam et al. |
| 2012/0069185 A1 | 3/2012 | Stein |
| 2012/0154591 A1 | 6/2012 | Baur et al. |
| 2012/0162427 A1 | 6/2012 | Lynam |
| 2012/0200707 A1 | 8/2012 | Stein et al. |
| 2012/0314071 A1 | 12/2012 | Rosenbaum et al. |
| 2012/0320209 A1 | 12/2012 | Vico |
| 2013/0141580 A1 | 6/2013 | Stein et al. |
| 2013/0147957 A1 | 6/2013 | Stein |
| 2013/0169812 A1 | 7/2013 | Lu et al. |
| 2013/0222593 A1 | 8/2013 | Byrne et al. |
| 2013/0250114 A1 | 9/2013 | Lu |
| 2013/0278769 A1 | 10/2013 | Nix |
| 2013/0286193 A1 | 10/2013 | Pflug |
| 2013/0314503 A1 | 11/2013 | Nix et al. |
| 2013/0321629 A1* | 12/2013 | Zhang ............ H04N 17/002 348/148 |
| 2014/0043473 A1 | 2/2014 | Rathi et al. |
| 2014/0063254 A1 | 3/2014 | Shi et al. |
| 2014/0098229 A1 | 4/2014 | Lu et al. |
| 2014/0152825 A1 | 6/2014 | Schaffner |
| 2014/0247352 A1 | 9/2014 | Rathi et al. |
| 2014/0247354 A1 | 9/2014 | Knudsen |
| 2014/0320658 A1 | 10/2014 | Pliefke |
| 2014/0333729 A1 | 11/2014 | Pflug |
| 2014/0347486 A1 | 11/2014 | Okouneva |
| 2014/0350834 A1 | 11/2014 | Turk |
| 2015/0049193 A1* | 2/2015 | Gupta ............ G03B 43/00 348/148 |

FOREIGN PATENT DOCUMENTS

| | | |
|---|---|---|
| EP | 0697641 | 2/1996 |
| EP | 1115250 | 7/2001 |
| EP | 2377094 | 10/2011 |
| EP | 2667325 | 11/2013 |
| GB | 2233530 | 9/1991 |
| JP | S5539843 | 3/1980 |
| JP | S58110334 | 6/1983 |
| JP | 6216073 | 4/1987 |
| JP | 6272245 | 5/1987 |
| JP | 01123587 | 5/1989 |
| JP | H1168538 | 7/1989 |
| JP | H236417 | 8/1990 |
| JP | 03099952 | 4/1991 |
| JP | 6227318 | 8/1994 |
| JP | 07105496 | 4/1995 |
| JP | 2630604 | 7/1997 |
| JP | 200274339 | 3/2002 |
| JP | 20041658 | 1/2004 |
| WO | WO2012139636 | 10/2012 |
| WO | WO2012139660 | 10/2012 |
| WO | WO2012143036 | 10/2012 |
| WO | WO2012145822 | 11/2012 |
| WO | WO2013019795 | 2/2013 |
| WO | WO2013074604 | 5/2013 |
| WO | WO2013081985 | 6/2013 |
| WO | WO2013086249 | 6/2013 |
| WO | WO2013109869 | 7/2013 |

OTHER PUBLICATIONS

Behringer et al., "Simultaneous Estimation of Pitch Angle and Lane Width from the Video Image of a Marked Road," pp. 966-973, Sep. 12-16, 1994.

Bow, Sing T., "Pattern Recognition and Image Preprocessing (Signal Processing and Communications)", CRC Press, Jan. 15, 2002, pp. 557-559.

Kastrinaki et al., "A survey of video processing techniques for traffic applications," 2003.

Vlacic et al. (Eds), "Intelligent Vehicle Tecnologies, Theory and Applications", Society of Automotive Engineers Inc., edited by SAE International, 2001.

\* cited by examiner

FIRST FIELD...
0 1 0 0 1 1 1 0 0 0 0 1 0 1 0 0
0 0 0 1 0 0 0 0 0 1 0 0 0 1 0 1
0 0 1 0 0 1 0 1 1 0 0 0 1 1 0 0
0 0 0 0 1 0 0 0 0 0 1 0 0 0 0 0
0 0 1 0 0 1 0 0 0 0 0 0 0 0 0 0
1 0 0 0 1 0 0 1 0 0 1 1 1 0 1 0
1 0 0 0 0 0 0 1 0 0 0 0 1 0 0 1
0 0 0 0 0 0 0 0 1 0 0 0 0 0 0 0

FIG. 12A

SECOND FIELD...
1 0 0 0 0 0 0 0 0 0 0 0 1 0 0 1
0 1 0 0 0 0 0 0 0 0 1 0 0 1 0 1
0 0 0 0 1 0 0 1 1 0 0 0 1 0 0 0
0 0 0 0 0 0 1 1 0 1 1 1 1 1 0 0
0 0 0 1 1 0 0 0 1 1 0 0 1 0 1 0
0 0 1 0 0 0 0 0 0 0 1 0 0 0 0 0
0 0 0 1 0 1 0 0 0 0 0 0 0 0 0 1
0 0 1 0 0 1 0 0 0 0 0 1 0 0 0 0

FIG. 12B

THIRD FIELD...
0 0 0 0 1 0 0 0 1 0 0 0 0 0 0 0
0 0 0 0 1 0 0 0 0 0 0 0 0 0 0 1
0 0 0 1 0 0 1 0 1 1 0 0 0 0 0 0
0 0 0 0 0 0 1 0 0 0 0 1 1 1 0 1
0 0 1 1 0 0 1 1 0 0 0 1 1 0 0 0
0 1 1 0 0 1 0 0 1 1 0 0 0 1 0 0
1 0 0 0 0 1 0 0 1 0 0 1 0 0 0 0
0 0 0 1 1 0 0 0 0 0 0 0 1 0 1 0

FIG. 12C

FOURTH FIELD...
0 0 0 0 0 0 0 0 0 0 0 0 0 0 1 0
0 0 0 0 0 0 0 0 1 0 0 1 1 0 0 0
0 0 0 0 1 1 1 0 1 0 1 0 0 1 1 0
0 1 0 1 0 0 0 0 0 1 0 1 1 0 0 0
0 0 1 1 1 0 1 1 0 0 0 1 0 0 0 0
0 0 0 0 0 1 0 0 0 0 1 1 1 0 0 1
0 0 0 0 0 1 0 1 0 0 0 0 0 1 0 0
0 1 0 0 0 0 0 1 0 0 0 0 0 0 0 0

FIG. 12D

CALIBRATION SYSTEM AND METHOD FOR MULTI-CAMERA VISION SYSTEM

CROSS REFERENCE TO RELATED APPLICATION

The present application claims the filing benefits of U.S. provisional application Ser. No. 61/772,014, filed Mar. 4, 2013, which is hereby incorporated herein by reference in its entirety.

FIELD OF THE INVENTION

The present invention relates to imaging systems or vision systems for vehicles.

BACKGROUND OF THE INVENTION

Use of imaging sensors in vehicle imaging systems is common and known. Examples of such known systems are described in U.S. Pat. Nos. 5,949,331; 5,670,935; and/or 5,550,677, which are hereby incorporated herein by reference in their entireties.

SUMMARY OF THE INVENTION

The present invention provides a calibration system for a vision system or imaging system for a vehicle that utilizes multiple cameras to capture images exterior of the vehicle, such as rearwardly and sidewardly and forwardly of the vehicle, such as for a surround view or bird's-eye view system of a vehicle. The cameras provide communication/data signals, including camera data or image data that may be displayed for viewing by the driver of the vehicle, and/or that is processed to merge the captured images from the cameras to provide or display a continuous surround view image for viewing by the driver of the vehicle. The cameras and/or image processing is calibrated to provide the continuous image or merged images.

According to an aspect of the present invention, the calibration system or method may include a calibration target or calibration targets that have irregular markings or dots, such as Pierced Dot Arrays (PDA) or the like, so as to enable the calibration system to detect not just the relative position of the calibration target(s) to the vehicle camera(s), but also the absolute position. This is especially of interest when the vehicle size and the camera positions are unknown, such as at an universal end-of-line calibration procedure or as an aftermarket or after end-of-line calibration procedure on which not just one but several vehicle types may be calibrated. Responsive to such detection or determination, the captured images can be stitched or merged together to provide a substantially seamless top-down view or bird's-eye view at the vehicle via capturing images and processing images captured by the vehicle cameras.

According to another aspect of the present invention, a calibration system for a multi-camera vision system of a vehicle includes multiple cameras disposed at the vehicle and having respective fields of view exterior of the vehicle. Multiple calibration targets are disposed at an area at which the vehicle is positioned for a calibrating procedure, with each target encompassed by a field of view of a respective camera. Each of the calibration targets comprises a patterned array of markings, with the pattern of the markings being irregular at each of the calibration targets. A control comprising an image processor is operable to process image data captured by the cameras. The control stores in memory the respective patterns of the markings of the calibration targets. The control is operable to process image data captured by the cameras that are being calibrated and, responsive to processing of image data captured by each of the cameras, the control is operable to determine a particular local pattern of markings of the respective calibration target viewed by the camera to determine the position of the respective calibration target relative to the camera. Responsive to processing of captured image data, the calibration system is operable to calibrate the multi-camera vision system (such as by calibrating or adjusting the camera or calibrating or adjusting the image processing or calibrating or adjusting an image stitching algorithm that stitches images captured by adjacent cameras (such as, for example, a rearward viewing camera and a sideward viewing camera) to provide a stitched (preferably substantially seamless) top down or panoramic image for displaying to a driver of the vehicle when the driver is operating the vehicle.

These and other objects, advantages, purposes and features of the present invention will become apparent upon review of the following specification in conjunction with the drawings.

BRIEF DESCRIPTION OF THE DRAWINGS

FIGS. 12A-D are exemplary targets or PDAs that have no symbol group or sub-array in common.

DESCRIPTION OF THE PREFERRED EMBODIMENTS

Figure 1:
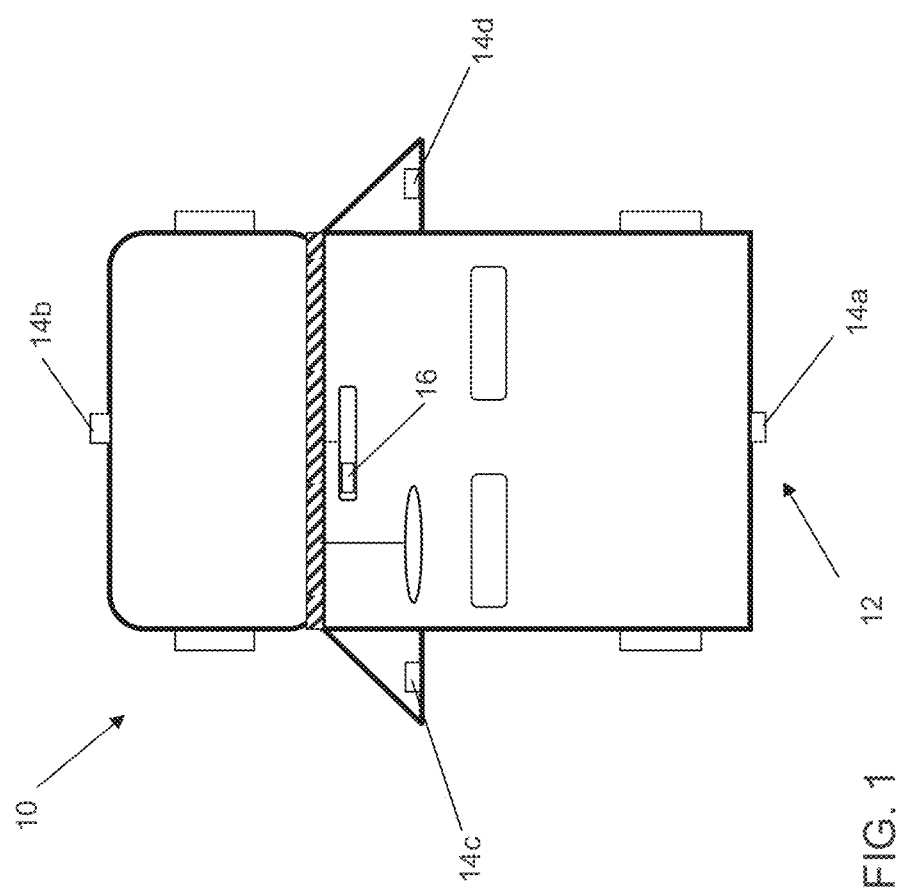
FIG. 1 is a plan view of a vehicle with a vision system and imaging sensors or cameras that provide exterior fields of view in accordance with the present invention.

Referring now to the drawings and the illustrative embodiments depicted therein, a vehicle 10 includes an imaging system or vision system 12 that includes a plurality of imaging sensors or cameras (such as a rearward facing imaging sensor or camera 14a and a forwardly facing camera 14b at the front (or at the windshield) of the vehicle, and a sidewardly and/or rearwardly facing camera 14c, 14b at the sides of the vehicle), which capture images exterior of the vehicle, with the cameras having a lens for focusing images at or onto an imaging array or imaging plane of the camera (FIG. 1). The vision system 12 is operable to process image data captured by the cameras and may merge or stitch the images together to provide a top view or surround view image display at a display device 16 for viewing by the driver of the vehicle (such as by utilizing aspects of the vision systems described in International Publication Nos. WO 2013/074604; WO 2010/099416; WO 2011/028686; WO 2012/075250; WO 2013/019795; WO 2012/075250; WO 2012/145822; WO 2013/081985; WO 2013/086249; and/or WO 2013/109869, and/or U.S. patent application Ser. No. 13/333,337, filed Dec. 21, 2011, which are hereby incorporated herein by reference in their entireties). Optionally, the vision system may process image data to detect objects, such as objects to the rear of the subject or equipped vehicle during a reversing maneuver, or such as approaching or following vehicles or vehicles at a side lane adjacent to the subject or equipped vehicle or the like. The method or system or process of the present invention is operable to process image data and calibrate the cameras so the images are accurately or optimally merged together to provide the top down or surround view display, as discussed below.

Figure 2:
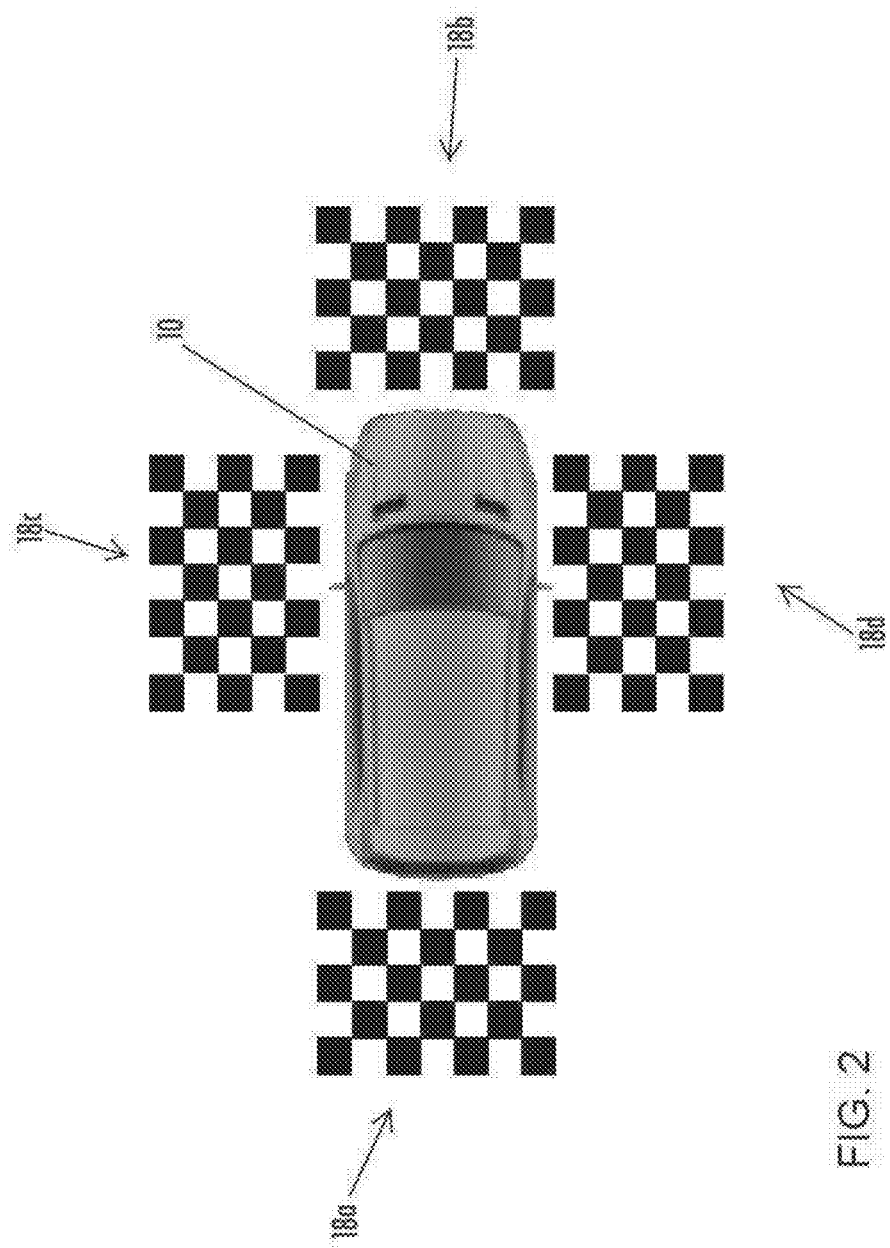
FIG. 2 is a plan view of a vehicle with checkerboard mats around the vehicle for calibrating the vehicle cameras.

Typically, cameras and/or processing of such vehicular surround view vision systems are calibrated at an end of line calibration process at the vehicle assembly plant. Such calibration systems typically comprise a plurality of calibration targets 18a, 18b, 18c, 18d fixed on the ground, whereby the vehicle 10 is driven to a position generally at the center of the targets, such as shown in FIG. 2. Vehicle production lines are often used for more than one vehicle type or platform. The consequences of these generalizations or shared production lines are that the vehicle dimensions vary and, in end-of-line calibration zones or areas, the calibration targets can often only be optimally positioned for one vehicle variant or type or lengths, and thus may be less than optimally positioned or even worse in an unknown position for other vehicle variants or types or lengths. Thus, the calibration system or process may be designed for one vehicle type or variant to provide optimal calibration of that vehicle type, while the calibration for the other vehicle types that are manufactured at that production line or facility may be less than optimal. Thus, the end-of-line calibration results may not be optimized or precise for all of the vehicle types manufactured at a given assembly facility or production line.

Figure 3:
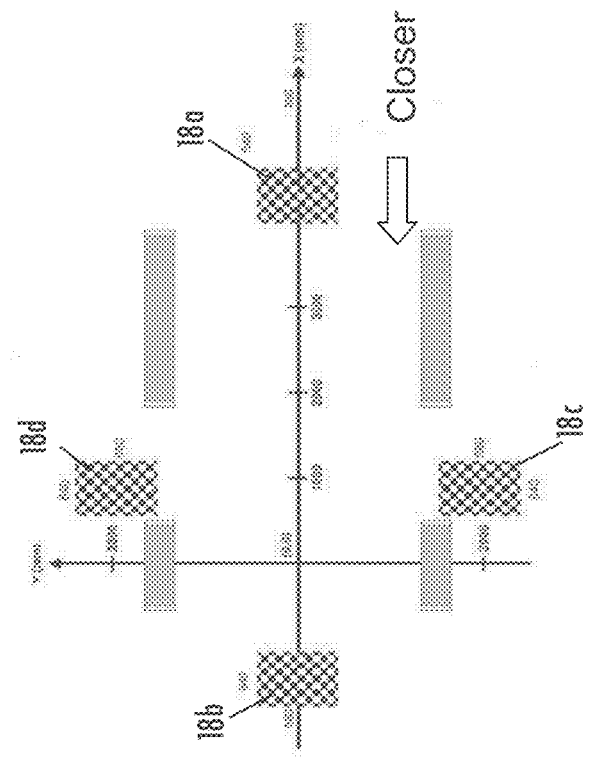
FIGS. 3 and 4 are schematics showing different calibration target positions for different length vehicle types.
Figure 4:
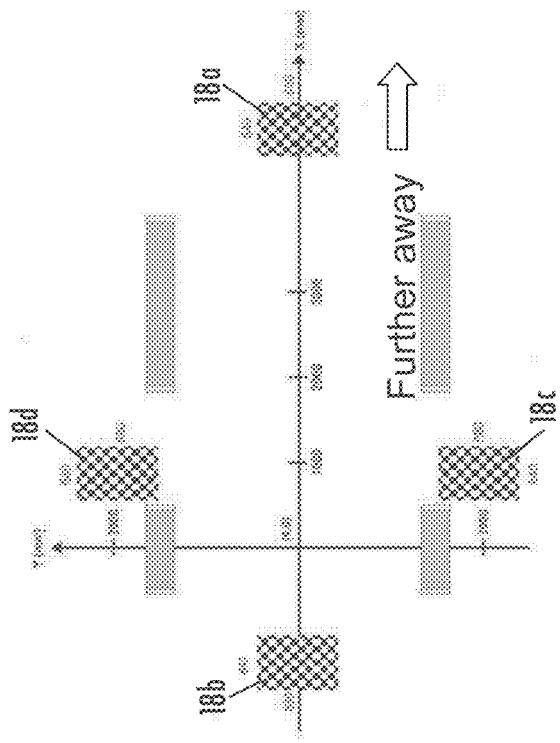

As can be seen with reference to FIGS. 3 and 4, due to different length and sized vehicles, the position of the cameras relative to the calibration targets vary because of the dimensions of the vehicle that is being calibrated, which results in the distance between the cameras and the respective targets sometimes being greater and sometimes being smaller or reduced. Thus, algorithmic adjustment of the processing may be needed to adapt the processing for the particular distances between the cameras and calibration targets during the calibration process.

It is desirable to have the targets at fixed or constant or non-varying distances from the cameras for all vehicles so that the processing algorithms may be configured or optimized for enhanced precision and thus enhanced calibrating of the system. For example, in order to optimize the calibration of systems on different length vehicles, the target 18a in FIG. 3 should be disposed further away from target 18b to accommodate a longer vehicle type, while the target 18a in FIG. 4 should be disposed closer to target 18b to accommodate a shorter vehicle type or the target should be larger to cover both the area 18a of FIG. 3 and area 18a of FIG. 4 as a combined target.

For top view or bird's eye view vision system calibration, not only is the relative position of the calibration pattern is relevant, but also the absolute position with regard to a common coordinate system. When the vehicle size and the camera position are unknown, it is difficult to make sure that each camera is able to capture the full pattern of a large target. This is the drawback of regular patterns such as dot arrays and chess or checker boards: if only part of the pattern is visible or viewable by the camera, it is impossible to tell what part of the pattern is visible or viewed by the camera. Absolute identification and localization of the point correspondences is hence impossible.

Known proposed solutions to this problem attempt to tag each point correspondence with a unique number, using a code similar to QR tags. Most prominent are ARtag and its derivation CALtag, which is designed for calibration. It has been found, however, that the recognition of coded tag IDs is too computationally expensive.

The present invention's use of Pierced Dot Arrays (PDA) provides a solution to this problem without the computational requirements of the known tagging approaches. While some of the techniques described in the following may also work for chess board patterns, dot arrays have been chosen for the following reasons:

a blob detector and center-of-mass calculator are readily available on field-programmable gate arrays (FPGA); and under any homographic transformation, the center-of-mass of a circle remains unaffected.

Optionally, the blob detection may use the y-channel in a Cb-Cr color room direct as input for the center of mass calculator (such that no extra filtering may be required).

Optionally, aspects of the FPGA based corner detector (such as described in U.S. patent application Ser. No. 14/093,980, filed Dec. 2, 2013, which is hereby incorporated herein by reference in its entirety) may come into use for the dot detection.

The present invention provides a method for absolute and automatic identification and localization of the calibration target point correspondences by utilizing Pierced Dot Arrays (PDA). Pierced Dot Arrays consist of an array of dots that are aligned in a defined grid. Some dots, however, are erased from the array (or colored different or shaded different or patterned different, such as via dots or dashes or the like in the circular patterned dots), in a way that allows for unique identification of any sub-array of a given size. When using black (present) and white (erased) or black and gray shaded or colored dots (see FIG. 8B), the decision criteria is digital. When using a gray dot instead of an erased block, the positional information is still in the grid which may be beneficial for fitting the sub-array. When using more colors as dots, more information can be incorporated into the DOT array. For example, three or more colors may be used in a pattern such that the system may determine, via image processing of captured image data, the camera calibration via recognizing a particular color pattern. For detecting more colored dot arrays, the detection algorithm may use different brightness thresholds or color filter thresholds or the like. For keeping the dot detection algorithm as primitive or lower technology as possible and for successfully implementing the system, black and white dots are preferred and discussed further below.

Figure 5:
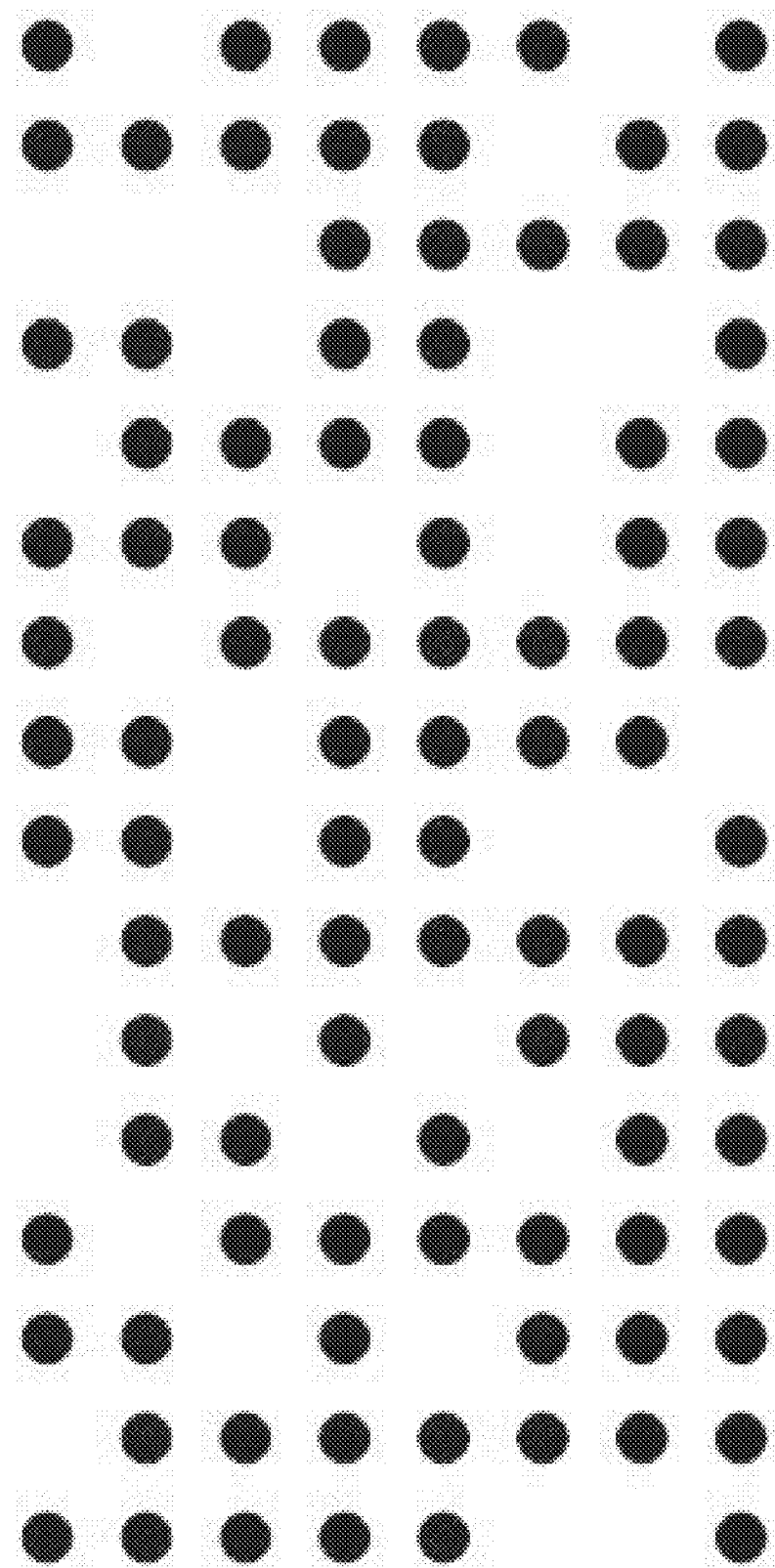
FIG. 5 is an exemplary Pierced Dot Array (PDA) with size 16×8 and 4×4 marker matrix size.
Figure 6:
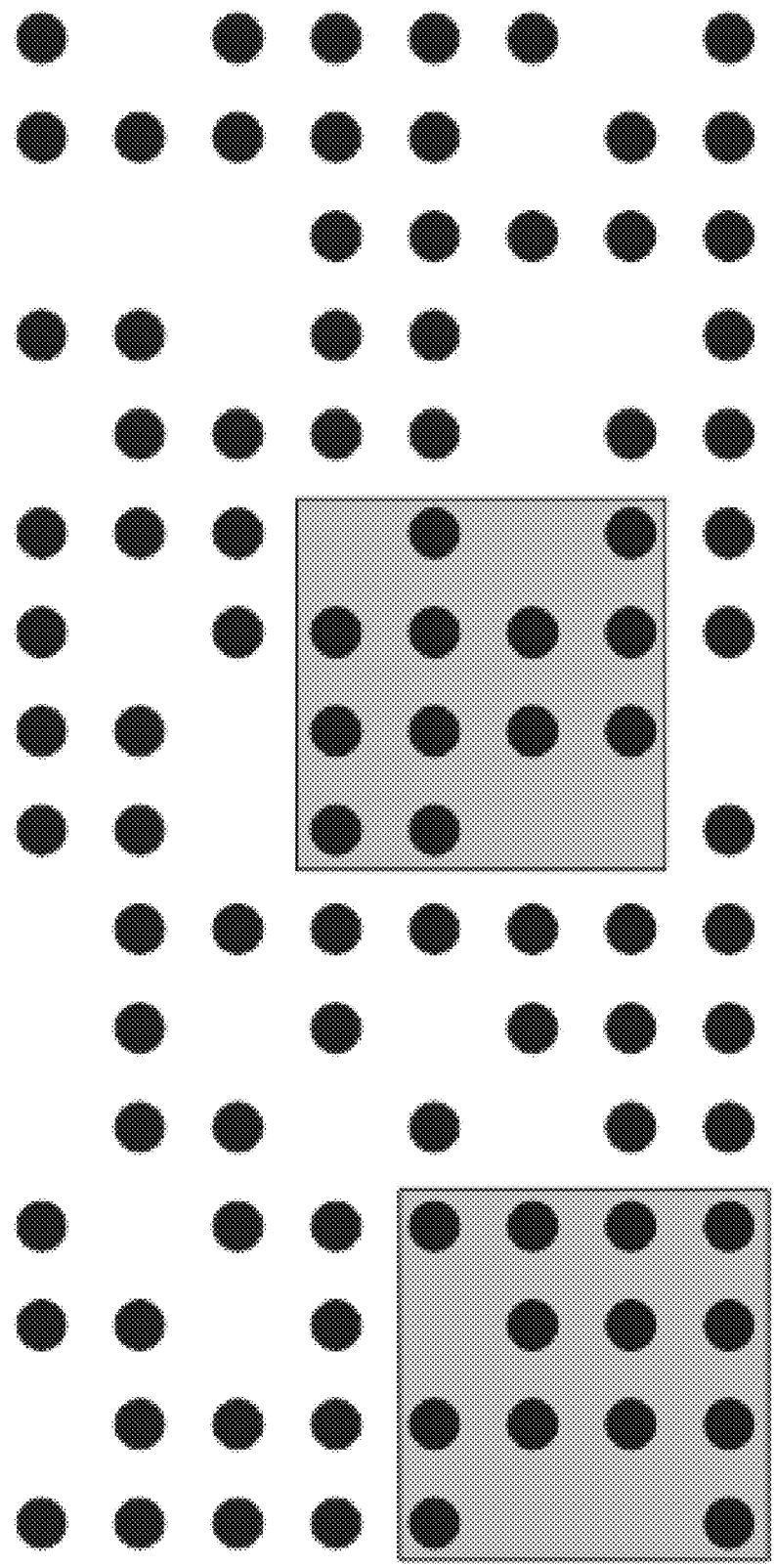
FIG. 6 shows two examples of marker matrices highlighted, where any other 4×4 sub-array is also uniquely identifiable.

FIGS. 5 and 6 show an example PDA or pattern of dots. Any rectangular sub-array of size 4×4 can be uniquely identified. For example, and as can be seen in FIG. 6, two distinct 4×4 sub-arrays are highlighted, showing the differences between the pattern of dots and erased dots for the sub-arrays. The sub-arrays, named marker matrices, have some special properties that make them useful and versatile.

Figure 7:
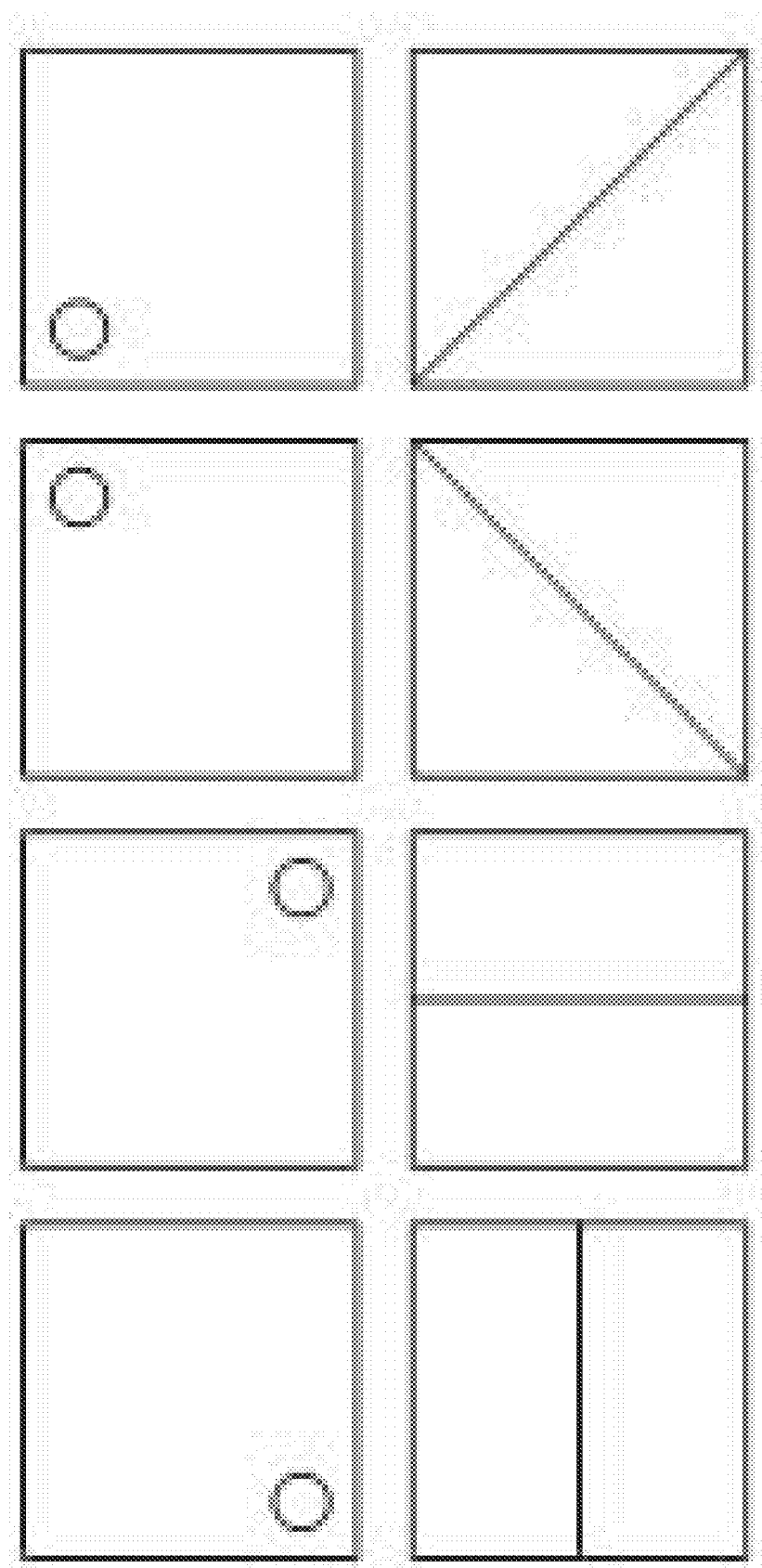
FIG. 7 shows exemplary symmetries of a square, with the upper row showing all four 90 degree rotations, and the lower row depicting horizontal, vertical and diagonal mirroring.

First, the marker matrices are uniquely identifiable, even when the image of the pattern is rotated or mirrored. For example, FIG. 7 shows the eight different symmetries of a square. Therefore, up to eight configurations belong to a symbol group (see, for example, FIG. 8). Each sub-array (marker matrix) of a PDA corresponds to exactly one symbol group. Each symbol group at maximum is present once in a given PDA.

Figure 9:
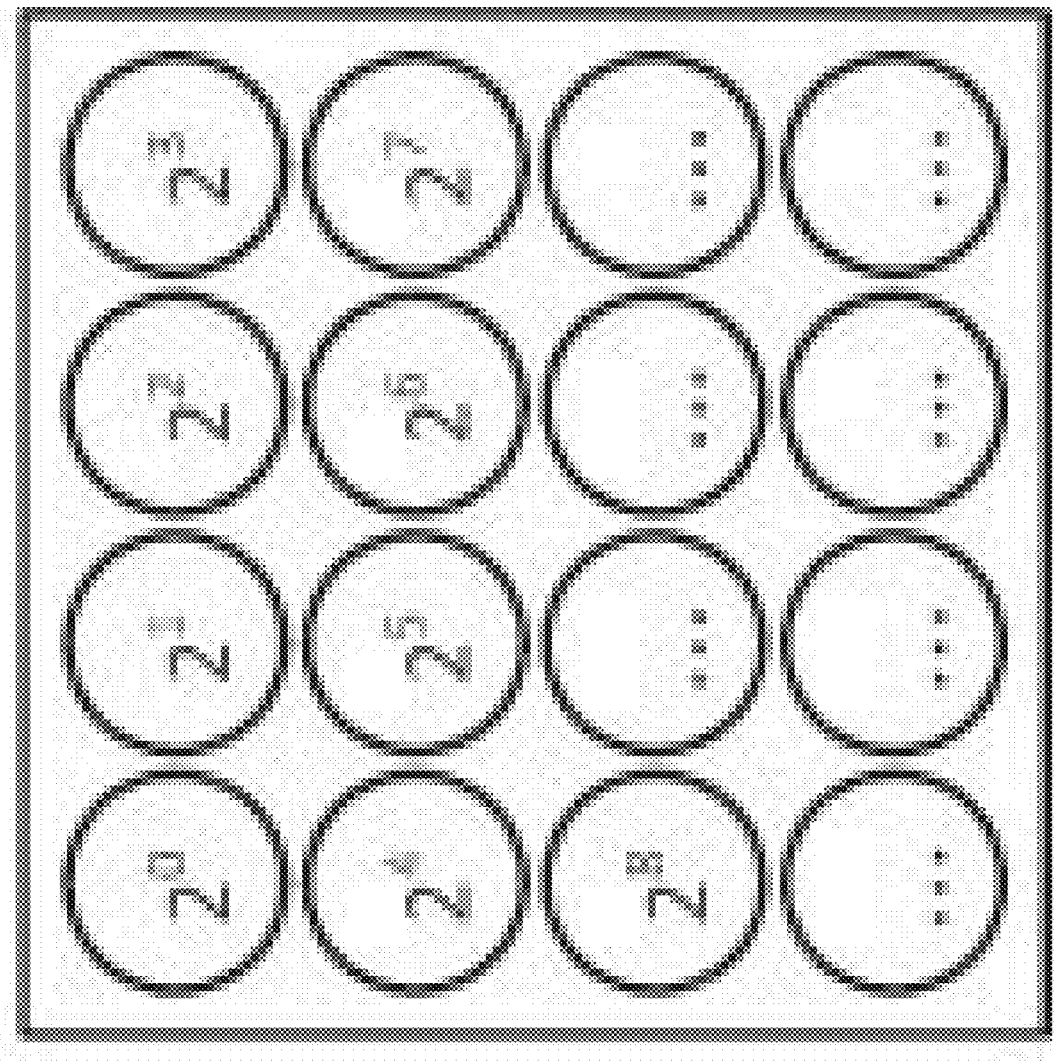
FIG. 9 shows the interpreting of a 4×4 marker matrix as 16 bit unsigned integer.

A marker matrix may be used to derive a unique ID. Each dot is interpreted as a bit position in an unsigned integer value. By convention, bit 0 is located in the upper left corner, and bit counting proceeds row-wise from left to right and upper to lower (FIG. 9). If a dot exists at a specific position, the corresponding bit is zero. If no dot exists, the corresponding bit is set.

To make the ID really unique, the bit value is normalized. To achieve this, the bits are rotated and mirrored into all eight positions. The smallest value is the normalized ID. For example, the example marker matrix in FIGS. 8A and 8B has the corresponding values (unsorted) 12288, 34816, 12, 17, 3, 49152, 4352 and 136. The smallest value is 3, so 3 is the normalized ID of this symbol group.

From uniquely identifying a single marker matrix, the location of every dot in the grid may be derived.

Creating PDAs is not trivial, and no constructive approach is known yet. It is, however, possible to generate PDAs with desired properties using heuristic approaches. The examples given in this document have a size of 16×8 dots, a marker matrix size of 4×4, and 32 pierced dot positions (25 percent). Several PDAs have been generated, four of which have the interesting feature of having no symbol group in common (as can be seen in FIGS. 12A, 12B, 12C and 12D).

It may be desirable to further constrain the generation of PDA to optimize for calibration purposes. Some ideas include:
Reduce the number of pierced dot positions;
Limit the number of piercings per row or column;
Limit the number of piercings per marker matrix (such as, for example, 4); and
Do not allow "clustering" of pierced dot positions.

Figure 10:
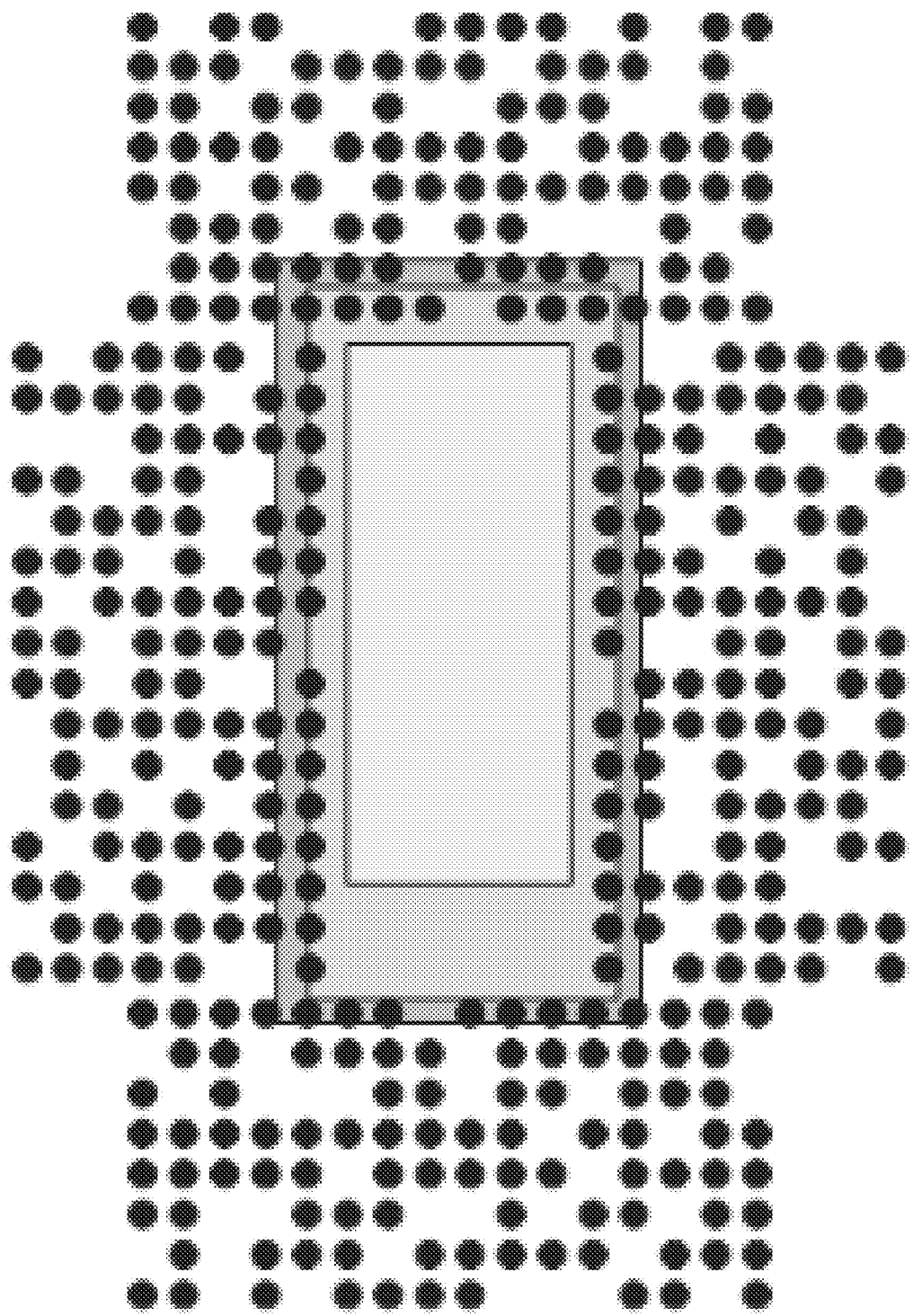
FIG. 10 shows the "Magic Carpet Concept", shown with four independent targets or PDAs with three example car sizes and positions being highlighted in gray tones.

When using PDAs as a vision system's calibration target, a "Magic Carpet Concept" comes into use. The Magic Carpet Concept consists of four calibration PDA patterns arranged around (in front, rear and at the sides) the vehicle that is undergoing calibration. The array or carpet is wide and close enough that all cameras of all of the to be tested vehicle types and sizes have the test pattern in view of the vehicle's cameras during calibration. Such a magic carpet is shown in FIG. 10. As can be seen in FIG. 10, it becomes apparent that parts of the carpet may be covered by the vehicle itself when calibrating large vehicles. This does not harm to the area distinction of single 4×4 areas.

For calibrating the four cameras necessary for a seamless top down view image, the algorithm below comes into use.
The magic carpet algorithm works as follows:
Capture four images simultaneously with all four cameras.
For each captured image:
Correct the captured image for lens distortion (inside FPGA; logiVIEW);
Perform the blob detection and the center-of-mass calculation from intensity values (inside FPGA). Only blob center coordinates are considered from here on;
Reconstruct grid lines from blob center coordinates by means of a suitable algorithm, such as, for example, RANSAC or the like;
Precisely identify point correspondences by utilizing line intersections. Pierced dot locations (erased dots on the grid) can be recovered in most if not all cases;
Find a 4×4 marker matrix. Sample the intensity value of the undistorted captured image at the identified positions and recover the marker matrix's bit values (black: bit cleared, white: bit set);
Normalize the ID and obtain the point correspondences for the points within the marker matrix. From here, all point correspondences can be identified by using their relative position to the already identified points; and
Feed as many point correspondences as possible into a suitable homographic matrix calculation (such as, for example, DLT or the like).

Figure 11:
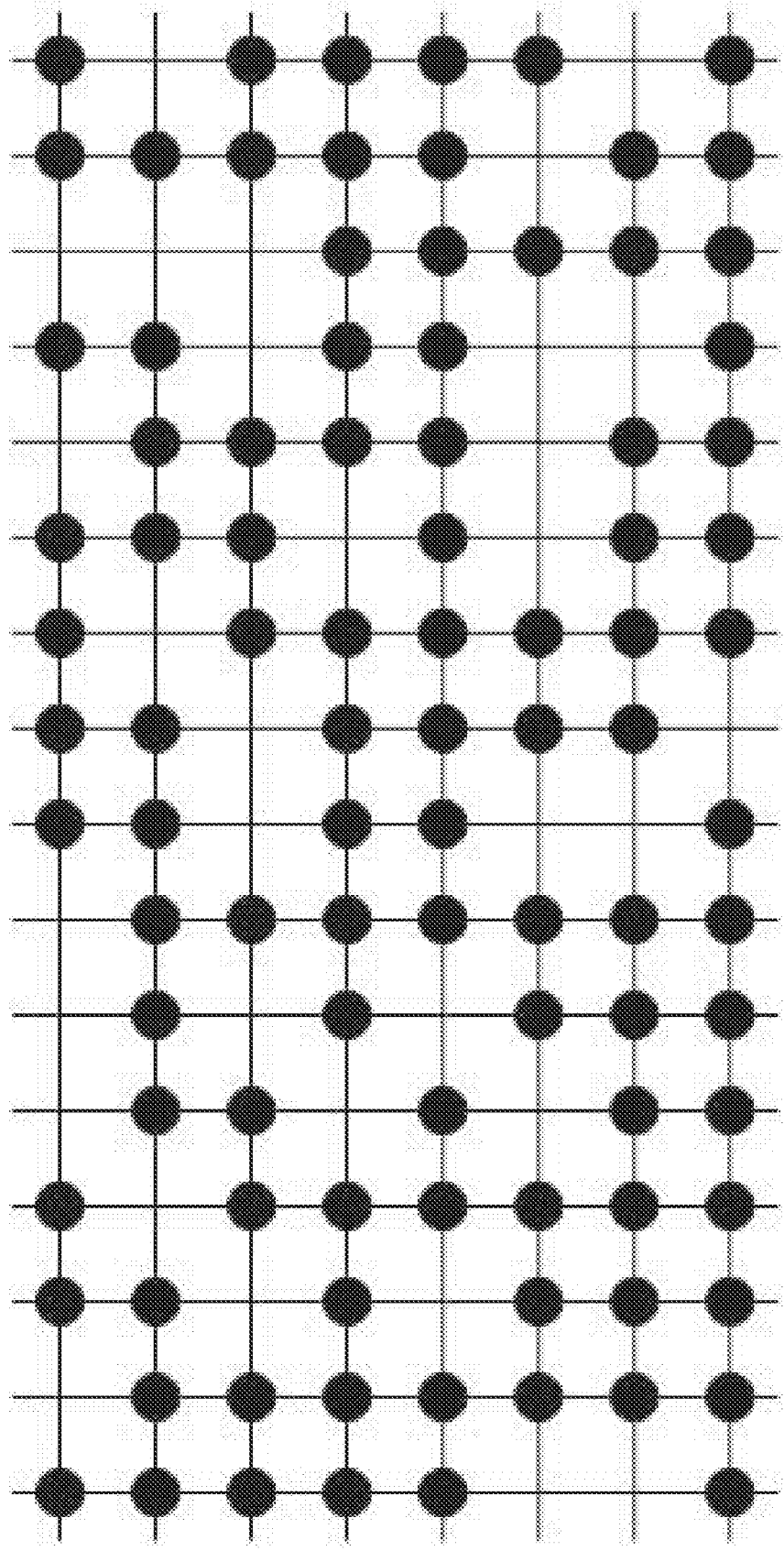
FIG. 11 shows dot correspondences after grid reconstruction (schematic overview only), wherein erased dots may be reconstructed in almost all cases.

A grid reconstruction result such as an output of the algorithm above would produce is shown in FIG. 11. This represents the matrix portion at the front of the vehicle, such as captured by a forward facing camera of the vehicle.

Thus, the present invention provides a camera calibration system that comprises a target array of black and white dots (or colored dots or black, gray and/or white dots or the like), with the different colored or shaded dots are arranged in a pattern at a ground surface of a calibration area. The calibration area may be at an end of line of a vehicle assembly plant or facility or at a service station or facility or the like. A vehicle with a multi-camera vision system may be driven or positioned at the target array, and image data captured by the cameras is processed to determine whether or not the camera or cameras are properly calibrated. The system can determine the cameras' positions at the vehicle by the images that they are capturing of the targets and can determine if the cameras are properly calibrated (and optionally may electronically accommodate or correct for any determined misalignment, such as by using aspects of the vision systems described in U.S. Pat. No. 7,720,580, which is hereby incorporated herein by reference in its entirety, and optionally calibrates a stitching algorithm of the vision system, such as by utilizing aspects of the systems described in U.S. Pat. Nos. 6,222,447; 5,949,331; 5,760,962; 5,670,935 and/or 5,550,677, and/or U.S. patent applications, Ser. No. 12/508,840, filed Jul. 24, 2009; Ser. No. 13/848,796, filed Mar. 22, 2013, Ser. No. 13/852,190, filed Mar. 28, 2013, Ser. No. 13/894,870, filed May 15, 2013, Ser. No. 14/046,174, filed Oct. 4, 2013, and/or Ser. No. 14/191,512, filed Feb. 27, 2014, which are hereby incorporated herein by reference in their entireties).

Furthermore, the camera locations may vary between vehicle models and the system may determine the calibration of cameras for different models (such as in applications where two or more vehicle models may be assembled or manufactured at the same assembly plant). By identifying a target's identity, the capturing camera's application position may be known without further efforts in terms of exchanging parameters or the like to the vision system. The system can determine the location and orientation of the cameras based on image processing of image data captured by the cameras that encompasses the target pattern arrays, and can determine if the cameras are calibrated/aligned properly responsive to such image processing.

The camera calibration system of the present invention is operable to calibrate cameras of a vehicle. For example, a first camera may be disposed at a vehicle and having a first field of view, such as rearward of the vehicle, and a second camera may be disposed at a vehicle and having a second field of view, such as generally sideward of the vehicle at a driver side of the vehicle, and a third camera may be disposed at a vehicle and having a third field of view, such as generally sideward of the vehicle at a passenger side of the vehicle (optionally, a fourth camera may be disposed at a vehicle and having a fourth field of view, such as forward of the vehicle). A calibration target is disposed at a ground surface at which the vehicle is positioned for a camera calibrating procedure. The calibration target comprises a first target portion encompassed by the first field of view of the first camera, a second target portion encompassed by the second field of view of the second camera, and a third target portion encompassed by the third field of view of the third camera (and optionally, a fourth target portion encompassed by the fourth field of view of the fourth camera). The calibration target comprises a patterned array of markings, and the pattern of the markings is non-uniform at each of the target portions. A control comprises an image processor operable to process image data captured by the first, second and third cameras (and optionally the fourth camera). The control stores in memory the pattern of markings. The control is operable to process image data captured by the cameras that are being calibrated and, responsive to processing of image data captured by each of the cameras, the control is operable to determine a particular pattern of markings of the respective target portion viewed by the camera to determine the position of the respective target portion relative to the camera. Responsive to processing of captured image data, the camera calibration system is operable to calibrate the multi-camera vision system of the vehicle, and may calibrate the cameras and/or image processing of the cameras and/or an image stitching algorithm that stitches together images captured by adjacent cameras (such as a front camera and a side camera that have overlapping fields of view) to provide a stitched, preferably substantially seamless, top view image for display to the driver of the vehicle.

Figure 8A:
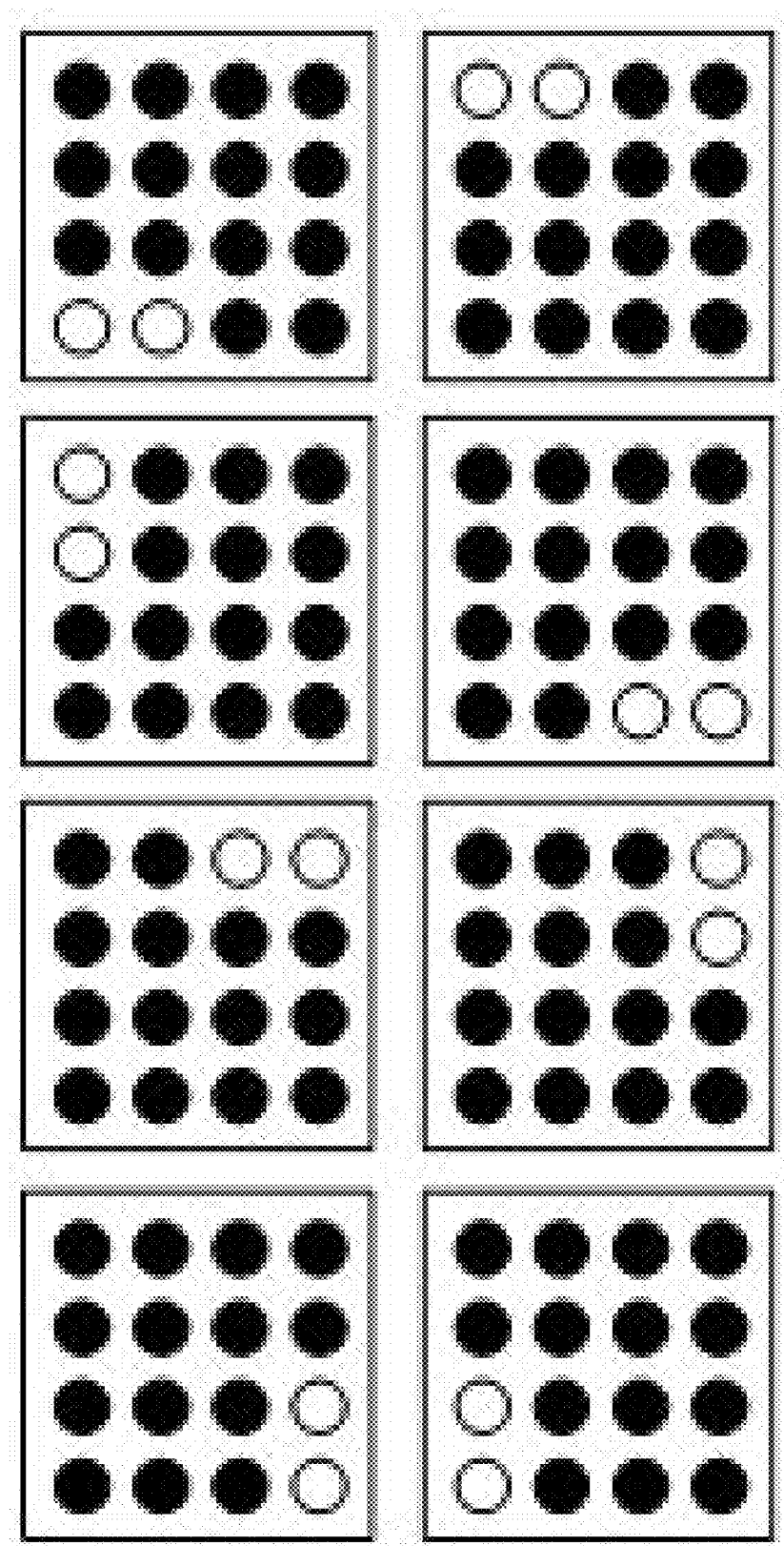
FIG. 8A shows symmetries of an example 4×4 marker matrix in correspondence with the symmetries of FIG. 7, with the configurations belonging to a single symbol group.
Figure 8B:
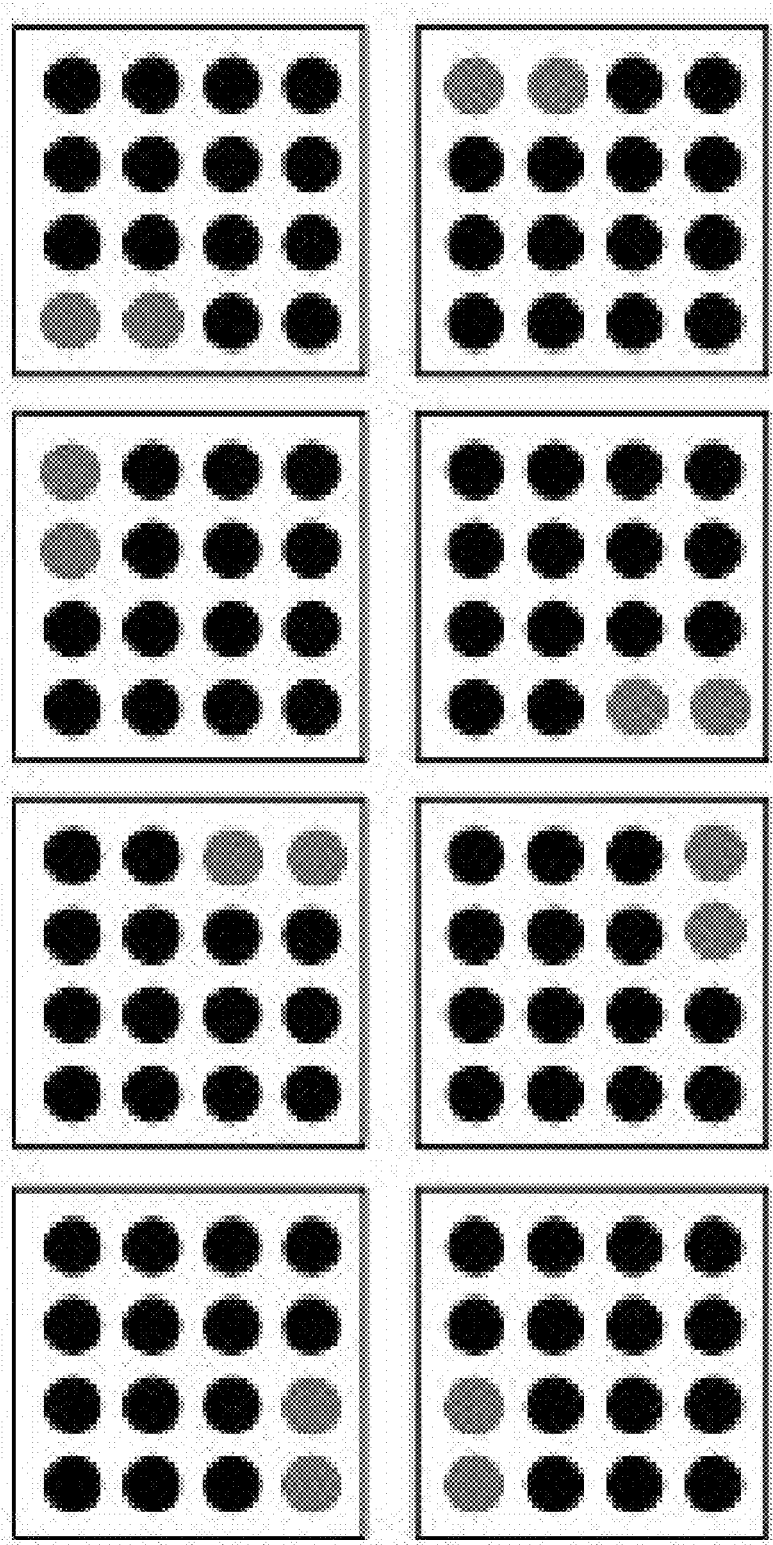
FIG. 8B is similar to FIG. 8A, with the white dots replaced by colored dots.

The markings may be any shape and may be arranged in any pattern. For example, the markings may comprise dots, such as circular shaped dots, or may comprise square markings or oval markings or any suitably shaped markings. The pattern of markings may comprise some darkened or outlined markings and spaces where no markings are provided (such as shown in FIG. 10), or may comprise an array of markings arranged in a pattern of differently shaded markings (such as shown in FIG. 8B) or differently colored markings or black and white markings (such as shown in FIG. 8A) or the like. The placement of the markings or dots does not follow a regular placement scheme so that the array of markings comprises multiple unique sub-arrays, with few or no sub-arrays of a given size being the same as another of the sub-arrays. The markings are arranged in an irregular or non-uniform pattern, such that, for any viewed array or sub-array of the calibration target (as viewed and imaged by a particular camera) of a given size (such as, for example, a 4×4 array of markings or a 6×6 array of markings or an 8×8 array of markings or the like), the system (via the image processing of captured image data) will be able to determine where at the calibration target the particular camera is viewing. Based on the knowledge of the location of the markings or dots and the pattern (such as stored in memory of the control or the like), the control can compare the viewed image of the camera with the known calibration target pattern, and can determine the unique sub-array that the camera is imaging. Responsive to a determination of the particular viewing direction and area of the camera, the system can determine the calibration of the camera and/or system, and can adjust the system accordingly.

Thus, and in accordance with the present invention, and taking for example, calibration of a first camera at a vehicle, a calibration target is placed at a calibration area (typically on the ground) and the vehicle is positioned at the calibration area so that the camera's field of view images at least a portion of the calibration target. The image processor processes image data captured by the camera, and may process image data from a sub-array of the imager that is imaging a local portion of the calibration target, and identifies the particular local pattern imaged by the sub-array as a datum to establish the location and orientation of the camera relative to the calibration target. For example, the system may determine that a calibration sub-array of the camera images the unique particular local pattern of one of the shaded regions of FIG. 6, and thus, by comparing the determined local pattern with the known overall calibration target pattern, the system can determine very accurately the location of the determined local pattern of the calibration target relative to the vehicle and camera and thus, the system can determine how the camera is positioned and oriented at the vehicle.

The system includes an image processor operable to process image data captured by the camera or cameras, such as for detecting objects or other vehicles or pedestrians or the like in the field of view of one or more of the cameras. For example, the image processor may comprise an EyeQ2 or EyeQ3 image processing chip available from Mobileye Vision Technologies Ltd. of Jerusalem, Israel, and may include object detection software (such as the types described in U.S. Pat. Nos. 7,855,755; 7,720,580; and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or International Publication Nos. WO 2011/028686; WO 2010/099416; WO 2012/061567; WO 2012/068331; WO 2012/075250; WO 2012/103193; WO 2012/0116043; WO 2012/0145313; WO 2012/0145501; WO 2012/145818; WO 2012/145822; WO 2012/158167; WO 2012/075250; WO 2012/0116043; WO 2012/0145501; WO 2012/154919; WO 2013/019707; WO 2013/016409; WO 2013/019795; WO 2013/067083; WO 2013/070539; WO 2013/043661; WO 2013/048994; WO 2013/063014, WO 2013/081984; WO 2013/081985; WO 2013/074604; WO 2013/086249; WO 2013/103548; WO 2013/109869; WO 2013/123161; WO 2013/126715; WO 2013/043661 and/or WO 2013/158592, and/or U.S. patent applications, Ser. No. 14/169,329, filed Jan. 31, 2014; Ser. No. 14/169,328, filed Jan. 31, 2014; Ser. No. 14/163,325, filed Jan. 24, 2014; Ser. No. 14/159,772, filed Jan. 21, 2014; Ser. No. 14/107,624, filed Dec. 16, 2013; Ser. No. 14/102,981, filed Dec. 11, 2013; Ser. No. 14/102,980, filed Dec. 11, 2013; Ser. No. 14/098,817, filed Dec. 6, 2013; Ser. No. 14/097,581, filed Dec. 5, 2013; Ser. No. 14/093,981, filed Dec. 2, 2013; Ser. No. 14/093,980, filed Dec. 2, 2013; Ser. No. 14/082,573, filed Nov. 18, 2013; Ser. No. 14/082,574, filed Nov. 18, 2013; Ser. No. 14/082,575, filed Nov. 18, 2013; Ser. No. 14/082,577, filed Nov. 18, 2013; Ser. No. 14/071,086, filed Nov. 4, 2013; Ser. No. 14/076,524, filed Nov. 11, 2013; Ser. No. 14/052,945, filed Oct. 14, 2013; Ser. No. 14/046,174, filed Oct. 4, 2013; Ser. No. 14/016,790, filed Oct. 3, 2013; Ser. No. 14/036,723, filed Sep. 25, 2013; Ser. No. 14/016,790, filed Sep. 3, 2013; Ser. No. 14/001,272, filed Aug. 23, 2013; Ser. No. 13/970,868, filed Aug. 20, 2013; Ser. No. 13/964,134, filed Aug. 12, 2013; Ser. No. 13/942,758, filed Jul. 16, 2013; Ser. No. 13/942,753, filed Jul. 16, 2013; Ser. No. 13/927,680, filed Jun. 26, 2013; Ser. No. 13/916,051, filed Jun. 12, 2013; Ser. No. 13/894,870, filed May 15, 2013; Ser. No. 13/887,724, filed May 6, 2013; Ser. No. 13/852,190, filed Mar. 28, 2013; Ser. No. 13/851,378, filed Mar. 27, 2013; Ser. No. 13/848,796, filed Mar. 22, 2012; Ser. No. 13/847,815, filed Mar. 20, 2013; Ser. No. 13/800,697, filed Mar. 13, 2013; Ser. No. 13/785,099, filed Mar. 5, 2013; Ser. No. 13/779,881, filed Feb. 28, 2013; Ser. No. 13/774,317, filed Feb. 22, 2013; Ser. No. 13/774,315, filed Feb. 22, 2013; Ser. No. 13/681,963, filed Nov. 20, 2012; Ser. No. 13/660,306, filed Oct. 25, 2012; Ser. No. 13/653,577, filed Oct. 17, 2012; and/or Ser. No. 13/534,657, filed Jun. 27, 2012, and/or U.S. provisional applications, Ser. No. 61/935,485, filed Feb. 4, 2014; Ser. No. 61/935,057, filed Feb. 3, 2014; Ser. No. 61/935,056, filed Feb. 3, 2014; Ser. No. 61/935,055, filed Feb. 3, 2014; Ser. 61/931,811, filed Jan. 27, 2014; Ser. No. 61/919,129, filed Dec. 20, 2013; Ser. No. 61/919,130, filed Dec. 20, 2013; Ser. No. 61/919, 131, filed Dec. 20, 2013; Ser. No. 61/919,147, filed Dec. 20, 2013; Ser. No. 61/919,138, filed Dec. 20, 2013, Ser. No. 61/919,133, filed Dec. 20, 2013; Ser. No. 61/918,290, filed Dec. 19, 2013; Ser. No. 61/915,218, filed Dec. 12, 2013; Ser. No. 61/912,146, filed Dec. 5, 2013; Ser. No. 61/911, 666, filed Dec. 4, 2013; Ser. No. 61/911,665, filed Dec. 4, 2013; Ser. No. 61/905,461, filed Nov. 18, 2013; Ser. No. 61/905, 462, filed Nov. 18, 2013; Ser. No. 61/901,127, filed Nov. 7, 2013; Ser. No. 61/895,610, filed Oct. 25, 2013; Ser. No. 61/895,609, filed Oct. 25, 2013; Ser. No. 61/879,837, filed Sep. 19, 2013; Ser. No. 61/879,835, filed Sep. 19, 2013; Ser. No. 61/878,877, filed Sep. 17, 2013; Ser. No. 61/875,351, filed Sep. 9, 2013; Ser. No. 61/869,195, filed. Aug. 23, 2013; Ser. No. 61/864,835, filed Aug. 12, 2013; Ser. No. 61/864, 836, filed Aug. 12, 2013; Ser. No. 61/864,837, filed Aug. 12, 2013; Ser. No. 61/864,838, filed Aug. 12, 2013; Ser. No. 61/856,843, filed Jul. 22, 2013, Ser. No. 61/845,061, filed Jul. 11, 2013; Ser. No. 61/844,630, filed Jul. 10, 2013; Ser. No. 61/844,173, filed Jul. 9, 2013; Ser. No. 61/844,171, filed Jul. 9, 2013; Ser. No. 61/842,644, filed Jul. 3, 2013; Ser. No. 61/840,542, filed Jun. 28, 2013; Ser. No. 61/838,619, filed Jun. 24, 2013; Ser. No. 61/838,621, filed Jun. 24, 2013; Ser. No. 61/837,955, filed Jun. 21, 2013; Ser. No. 61/836,900, filed Jun. 19, 2013; Ser. No. 61/836,380, filed Jun. 18, 2013; Ser. No. 61/833,080, filed Jun. 10, 2013; Ser. No. 61/830, 375, filed Jun. 3, 2013; Ser. No. 61/830,377, filed Jun. 3, 2013; Ser. No. 61/825,752, filed May 21, 2013; Ser. No. 61/825,753, filed May 21, 2013; Ser. No. 61/823,648, filed May 15, 2013; Ser. No. 61/823,644, filed May 15, 2013; Ser. No. 61/821,922, filed May 10, 2013; Ser. No. 61/819,835, filed May 6, 2013; Ser. No. 61/819,033, filed May 3, 2013; Ser. No. 61/816,956, filed Apr. 29, 2013; Ser. No. 61/815, 044, filed Apr. 23, 2013; Ser. No. 61/814,533, filed Apr. 22, 2013; Ser. No. 61/813,361, filed Apr. 18, 2013; Ser. No. 61/810,407, filed Apr. 10, 2013; Ser. No. 61/808,930, filed Apr. 5, 2013; Ser. No. 61/806,674, filed Mar. 29, 2013; Ser. No. 61/793,592, filed Mar. 15, 2013; Ser. No. 61/772,015, filed Mar. 4, 2013; Ser. No. 61/772,014, filed Mar. 4, 2013; Ser. No. 61/770,051, filed Feb. 27, 2013; and/or Ser. No. 61/766,883, filed Feb. 20, 2013, which are all hereby incorporated herein by reference in their entireties. The system may communicate with other communication systems via any suitable means, such as by utilizing aspects of the systems described in International Publication Nos. WO/2010/144900; WO 2013/043661 and/or WO 2013/081985, and/or U.S. patent application Ser. No. 13/202,005, filed Aug. 17, 2011, which are hereby incorporated herein by reference in their entireties.

The imaging device and control and image processor and any associated illumination source, if applicable, may comprise any suitable components, and may utilize aspects of the cameras and vision systems described in U.S. Pat. Nos. 5,550,677; 5,877,897; 6,498,620; 5,670,935; 5,796,094; 6,396,397; 6,806,452; 6,690,268; 7,005,974; 7,937,667; 7,123,168; 7,004,606; 6,946,978; 7,038,577; 6,353,392; 6,320,176; 6,313,454; and 6,824,281, and/or International Publication Nos. WO 2010/099416; WO 2011/028686; and/or WO 2013/016409, and/or U.S. Pat. Publication No. US 2010-0020170, and/or U.S. patent application Ser. No. 13/534,657, filed Jun. 27, 2012, which are all hereby incorporated herein by reference in their entireties. The camera or cameras may comprise any suitable cameras or imaging sensors or camera modules, and may utilize aspects of the cameras or sensors described in U.S. patent application Ser. No. 13/260,400, filed Sep. 26, 2011, and/or U.S. Pat. Nos.

7,965,336 and/or 7,480,149, and/or U.S. Pat. Publication No. US-2009-0244361, which are hereby incorporated herein by reference in their entireties. The imaging array sensor may comprise any suitable sensor, and may utilize various imaging sensors or imaging array sensors or cameras or the like, such as a CMOS imaging array sensor, a CCD sensor or other sensors or the like, such as the types described in U.S. Pat. Nos. 5,550,677; 5,670,935; 5,760,962; 5,715,093; 5,877,897; 6,922,292; 6,757,109; 6,717,610; 6,590,719; 6,201,642; 6,498,620; 5,796,094; 6,097,023; 6,320,176; 6,559,435; 6,831,261; 6,806,452; 6,396,397; 6,822,563; 6,946,978; 7,339,149; 7,038,577; 7,004,606; 7,720,580; and/or 7,965,336, and/or International Publication Nos. WO/2009/036176 and/or WO/2009/046268, which are all hereby incorporated herein by reference in their entireties.

The camera module and circuit chip or board and imaging sensor may be implemented and operated in connection with various vehicular vision-based systems, and/or may be operable utilizing the principles of such other vehicular systems, such as a vehicle headlamp control system, such as the type disclosed in U.S. Pat. Nos. 5,796,094; 6,097,023; 6,320,176; 6,559,435; 6,831,261; 7,004,606; 7,339,149; and/or 7,526,103, which are all hereby incorporated herein by reference in their entireties, a rain sensor, such as the types disclosed in commonly assigned U.S. Pat. Nos. 6,353,392; 6,313,454; 6,320,176; and/or 7,480,149, which are hereby incorporated herein by reference in their entireties, a vehicle vision system, such as a forwardly, sidewardly or rearwardly directed vehicle vision system utilizing principles disclosed in U.S. Pat. Nos. 5,550,677; 5,670,935; 5,760,962; 5,877,897; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; and/or 7,859,565, which are all hereby incorporated herein by reference in their entireties, a trailer hitching aid or tow check system, such as the type disclosed in U.S. Pat. No. 7,005,974, which is hereby incorporated herein by reference in its entirety, a reverse or sideward imaging system, such as for a lane change assistance system or lane departure warning system or for a blind spot or object detection system, such as imaging or detection systems of the types disclosed in U.S. Pat. Nos. 7,720,580; 7,038,577; 5,929,786 and/or 5,786,772, and/or U.S. patent applications, Ser. No. 11/239,980, filed Sep. 30, 2005, now U.S. Pat. No. 7,881,496, and/or U.S. provisional applications, Ser. No. 60/628,709, filed Nov. 17, 2004; Ser. No. 60/614,644, filed Sep. 30, 2004; Ser. No. 60/618,686, filed Oct. 14, 2004; Ser. No. 60/638,687, filed Dec. 23, 2004, which are hereby incorporated herein by reference in their entireties, a video device for internal cabin surveillance and/or video telephone function, such as disclosed in U.S. Pat. Nos. 5,760,962; 5,877,897; 6,690,268; and/or 7,370,983, and/or U.S. Pat. Publication No. US-2006-0050018, which are hereby incorporated herein by reference in their entireties, a traffic sign recognition system, a system for determining a distance to a leading or trailing vehicle or object, such as a system utilizing the principles disclosed in U.S. Pat. Nos. 6,396,397 and/or 7,123,168, which are hereby incorporated herein by reference in their entireties, and/or the like.

Optionally, the circuit board or chip may include circuitry for the imaging array sensor and or other electronic accessories or features, such as by utilizing compass-on-a-chip or EC driver-on-a-chip technology and aspects such as described in U.S. Pat. Nos. 7,255,451 and/or 7,480,149, and/or U.S. Pat. Publication No. US-2006-0061008, and/or U.S. patent application Ser. No. 12/578,732, filed Oct. 14, 2009, which are hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device disposed at or in the interior rearview mirror assembly of the vehicle, such as by utilizing aspects of the video mirror display systems described in U.S. Pat. No. 6,690,268 and/or U.S. patent application Ser. No. 13/333,337, filed Dec. 21, 2011, which are hereby incorporated herein by reference in their entireties. The video mirror display may comprise any suitable devices and systems and optionally may utilize aspects of the compass display systems described in U.S. Pat. Nos. 7,370,983; 7,329,013; 7,308,341; 7,289,037; 7,249,860; 7,004,593; 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; 6,513,252; and/or 6,642,851, and/or European patent application, published Oct. 11, 2000 under Publication No. EP 0 1043566, and/or U.S. Pat. Publication No. US-2006-0061008, which are all hereby incorporated herein by reference in their entireties. Optionally, the video mirror display screen or device may be operable to display images captured by a rearward viewing camera of the vehicle during a reversing maneuver of the vehicle (such as responsive to the vehicle gear actuator being placed in a reverse gear position or the like) to assist the driver in backing up the vehicle, and optionally may be operable to display the compass heading or directional heading character or icon when the vehicle is not undertaking a reversing maneuver, such as when the vehicle is being driven in a forward direction along a road (such as by utilizing aspects of the display system described in International Publication No. WO 2012/051500, which is hereby incorporated herein by reference in its entirety).

Optionally, the vision system (utilizing the forward facing camera and a rearward facing camera and other cameras disposed at the vehicle with exterior fields of view) may be part of or may provide a display of a top-down view or birds-eye view system of the vehicle or a surround view at the vehicle, such as by utilizing aspects of the vision systems described in International Publication Nos. WO 2010/099416; WO 2011/028686; WO2012/075250; WO 2013/019795; WO 2012/075250; WO 2012/145822; WO 2013/081985; WO 2013/086249; and/or WO 2013/109869, and/or U.S. patent application Ser. No. 13/333,337, filed Dec. 21, 2011, which are hereby incorporated herein by reference in their entireties.

Optionally, a video mirror display may be disposed rearward of and behind the reflective element assembly of an interior rearview mirror assembly of the vehicle and may comprise a display such as the types disclosed in U.S. Pat. Nos. 5,530,240; 6,329,925; 7,855,755; 7,626,749; 7,581,859; 7,446,650; 7,370,983; 7,338,177; 7,274,501; 7,255,451; 7,195,381; 7,184,190; 5,668,663; 5,724,187 and/or 6,690,268, and/or in U.S. Pat. Publication Nos. US-2006-0061008 and/or US-2006-0050018, which are all hereby incorporated herein by reference in their entireties. The display is viewable through the reflective element when the display is activated to display information. The display element may be any type of display element, such as a vacuum fluorescent (VF) display element, a light emitting diode (LED) display element, such as an organic light emitting diode (OLED) or an inorganic light emitting diode, an electroluminescent (EL) display element, a liquid crystal display (LCD) element, a video screen display element or backlit thin film transistor (TFT) display element or the like, and may be operable to display various information (as discrete characters, icons or the like, or in a multi-pixel manner) to the driver of the vehicle, such as passenger side inflatable restraint (PSIR) information, tire pressure status, and/or the like. The mirror assembly and/or display may utilize aspects described in U.S. Pat. Nos. 7,184,190; 7,255,451; 7,446,924 and/or 7,338,177, which are all hereby incorporated herein by reference in their entireties. The thicknesses and materials of the coatings on the substrates of the reflective element may be selected to provide a desired color or tint to the mirror reflective element, such as a blue colored reflector, such as is known in the art and such as described in U.S. Pat. Nos. 5,910,854; 6,420,036; and/or 7,274,501, which are hereby incorporated herein by reference in their entireties.

Optionally, the display or displays and any associated user inputs may be associated with various accessories or systems, such as, for example, a tire pressure monitoring system or a passenger air bag status or a garage door opening system or a telematics system or any other accessory or system of the mirror assembly or of the vehicle or of an accessory module or console of the vehicle, such as an accessory module or console of the types described in U.S. Pat. Nos. 7,289,037; 6,877,888; 6,824,281; 6,690,268; 6,672,744; 6,386,742; and 6,124,886, and/or U.S. Pat. Publication No. US-2006-0050018, which are hereby incorporated herein by reference in their entireties.

Changes and modifications to the specifically described embodiments may be carried out without departing from the principles of the present invention, which is intended to be limited only by the scope of the appended claims as interpreted according to the principles of patent law.

The invention claimed is:

1. A calibration system for a multi-camera vision system of a vehicle, said calibration system comprising:
   a first camera disposed at a vehicle and having a first field of view rearward of the vehicle;
   a second camera disposed at the vehicle and having a second field of view generally sideward of the vehicle at a driver side of the vehicle;
   a third camera disposed at the vehicle and having a third field of view generally sideward of the vehicle at a passenger side of the vehicle;
   first, second and third calibration targets disposed at an area at which the vehicle is positioned for a calibrating procedure;
   wherein said first calibration target is encompassed by said first field of view of said first camera;
   wherein said second calibration target is encompassed by said second field of view of said second camera;
   wherein said third calibration target is encompassed by said third field of view of said third camera;
   wherein each of said calibration targets comprises an irregular patterned array of markings, and wherein the pattern of said irregular patterned array of markings is irregular at each of said calibration targets;
   a control comprising an image processor operable to process image data captured by said first, second and third cameras;
   wherein said control stores in memory the respective irregular patterns of said markings of said first, second and third calibration targets;
   wherein said control is operable to process image data captured by said cameras that are being calibrated, and wherein, responsive to processing of image data captured by said cameras, said control determines a particular local irregular pattern of markings of the respective calibration target viewed by a respective one of said cameras;
   wherein said control determines, via comparing determined particular local irregular patterns of markings of the respective calibration target to the respective stored in memory irregular patterns of markings of said first, second and third calibration targets, the position of the respective calibration target relative to the respective camera; and
   wherein, responsive to processing of captured image data, said calibration system is operable to calibrate said multi-camera vision system.

2. The calibration system of claim 1, wherein said irregular patterned array of markings of said calibration targets comprises irregular pierced dot arrays.

3. The calibration system of claim 1, wherein said irregular patterned array of markings of said calibration targets comprises an irregular patterned array of dots arranged in an irregular pattern.

4. The calibration system of claim 3, wherein said irregular patterned array of dots comprises an irregular patterned array of circular dots.

5. The calibration system of claim 3, wherein said irregular patterned array of dots of said calibration targets comprises at least one of (i) a plurality of different colored dots arranged in an irregular color pattern, (ii) a plurality of black and white dots arranged in an irregular pattern, (iii) a plurality of differently shaded dots arranged in an irregular pattern.

6. The calibration system of claim 3, wherein said calibration system is operable to determine the position of a particular calibration target with respect to a particular camera based on the irregular pattern of dots of a sub-array of dots detected by the particular camera.

7. The calibration system of claim 1, wherein said irregular patterned array of markings comprises a plurality of sub-arrays of irregular markings and wherein no one sub-array is the same as any other sub-array of said irregular patterned array of markings.

8. The calibration system of claim 1, wherein, responsive to processing of captured image data, said calibration system is operable to determine the vehicle model.

9. The calibration system of claim 1, wherein, responsive to processing of captured image data, said calibration system is operable to calibrate vision systems of multiple types or sizes of vehicles positioned at said calibration targets.

10. The calibration system of claim 1, comprising a fourth camera disposed at the vehicle and having a fourth field of view forward of the vehicle, wherein a fourth calibration target is disposed at the area at which the vehicle is positioned for the calibrating-procedure, and wherein said fourth calibration target is encompassed by said fourth field of view of said fourth camera, and wherein said image processor is operable to process image data captured by said fourth camera, and wherein, responsive to processing of image data captured by said fourth camera, said control is operable to determine a particular local pattern of irregular markings of said fourth calibration target viewed by said fourth camera, and wherein said control determines, via comparing the determined particular local irregular pattern of markings of said fourth calibration target to a stored in memory irregular pattern of markings of said fourth calibration target, the position of said fourth calibration target relative to said fourth camera.

11. A calibration system for a multi-camera vision system of a vehicle, said calibration system comprising:
- a first camera disposed at a vehicle and having a first field of view rearward of the vehicle;
- a second camera disposed at the vehicle and having a second field of view generally sideward of the vehicle at a driver side of the vehicle;
- a third camera disposed at the vehicle and having a third field of view generally sideward of the vehicle at a passenger side of the vehicle;
- first, second and third calibration targets disposed at an area at which the vehicle is positioned for a calibrating procedure;
- wherein said first calibration target is encompassed by said first field of view of said first camera;
- wherein said second calibration target is encompassed by said second field of view of said second camera;
- wherein said third calibration target is encompassed by said third field of view of said third camera;
- wherein each of said calibration targets comprises an irregular patterned array of markings, and wherein the pattern of said irregular patterned array of markings is irregular at each of said calibration targets;
- wherein said irregular patterned array of markings comprises at least one of (i) a plurality of different colored markings arranged in an irregular color pattern, (ii) a plurality of black and white markings arranged in an irregular pattern, (iii) a plurality of differently shaded markings arranged in an irregular pattern and (iv) a plurality of circular dots arranged in an irregular pattern;
- a control comprising an image processor operable to process image data captured by said first, second and third cameras;
- wherein said control stores in memory the respective irregular patterns of said markings of said first, second and third calibration targets;
- wherein said control is operable to process image data captured by said cameras that are being calibrated, and wherein, responsive to processing of image data captured by each of said cameras, said control determines a particular local irregular pattern of markings of the respective calibration target viewed by a respective camera;
- wherein said control determines, via comparing determined particular local irregular patterns of markings of the respective calibration target to the respective stored in memory irregular patterns of markings of said first, second and third calibration targets, the position of the respective calibration target relative to the respective camera; and
- wherein, responsive to processing of captured image data, said calibration system is operable to calibrate said multi-camera vision system.

12. The calibration system of claim 11, wherein said irregular patterned array of markings of said calibration targets comprises irregular pierced dot arrays.

13. The calibration system of claim 11, wherein said irregular patterned array of markings of said calibration targets comprises a plurality of circular dots arranged in an irregular pattern.

14. The calibration system of claim 11, wherein said irregular patterned array of markings of said calibration targets comprises at least one of (i) different colored markings and (ii) different shaded markings.

15. The calibration system of claim 11, wherein, responsive to processing of captured image data, said calibration system is operable to calibrate vision systems of multiple types or sizes of vehicles positioned at said calibration targets.

16. The calibration system of claim 11, comprising a fourth camera disposed at the vehicle and having a fourth field of view forward of the vehicle, wherein a fourth calibration target is disposed at the area at which the vehicle is positioned for the calibrating procedure, and wherein said fourth calibration target is encompassed by said fourth field of view of said fourth camera, and wherein said image processor is operable to process image data captured by said fourth camera, and wherein, responsive to processing of image data captured by said fourth camera, said control is operable to determine a particular local irregular pattern of markings of said fourth calibration target viewed by said fourth camera, and wherein said control determines, via comparing the determined particular local irregular pattern of markings of said fourth calibration target to a stored in memory irregular pattern of markings of said fourth calibration target, the position of said fourth calibration target relative to said fourth camera.

17. A calibration system for a multi-camera vision system of a vehicle, said calibration system comprising:
- a first camera disposed at a vehicle and having a first field of view rearward of the vehicle;
- a second camera disposed at the vehicle and having a second field of view generally sideward of the vehicle at a driver side of the vehicle;
- a third camera disposed at the vehicle and having a third field of view generally sideward of the vehicle at a passenger side of the vehicle;
- a fourth camera disposed at the vehicle and having a fourth field of view generally forward of the vehicle;
- first, second, third and fourth calibration targets disposed at an area at which the vehicle is positioned for a calibrating procedure;
- wherein said first calibration target is encompassed by said first field of view of said first camera;
- wherein said second calibration target is encompassed by said second field of view of said second camera;
- wherein said third calibration target is encompassed by said third field of view of said third camera;
- wherein said fourth calibration target is encompassed by said fourth field of view of said fourth camera;
- wherein each of said calibration targets comprises an irregular patterned array of markings, and wherein the pattern of said irregular patterned array of markings is irregular at each of said calibration targets;
- wherein said irregular patterned array of markings comprises at least one of (i) a plurality of different colored markings arranged in an irregular color pattern, (ii) a plurality of black and white markings arranged in an irregular pattern, (iii) a plurality of differently shaded markings arranged in an irregular pattern and (iv) a plurality of circular dots arranged in an irregular pattern;
- a control comprising an image processor operable to process image data captured by said first, second, third and fourth cameras;
- wherein said control stores in memory the respective irregular patterns of said markings of said first, second, third and fourth calibration targets;
- wherein said control is operable to process image data captured by said cameras that are being calibrated, and wherein, responsive to processing of image data captured by each of said cameras, said control determines a particular local irregular pattern of markings of the respective calibration target viewed by a respective camera;

wherein said control determines, via comparing determined particular local irregular patterns of markings of the respective calibration target to the respective stored in memory irregular patterns of markings of said first, second, third and fourth calibration targets, the position of the respective calibration target relative to the respective camera; and wherein, responsive to processing of captured image data, said calibration system is operable to calibrate said multi-camera vision system.

18. The calibration system of claim 17, wherein said irregular patterned array of markings of said calibration targets comprises irregular pierced dot arrays.

19. The calibration system of claim 17, wherein said irregular patterned array of markings comprises at least one of (i) different colored markings and (ii) different shaded markings.

20. The calibration system of claim 17, wherein, responsive to processing of captured image data, said calibration system is operable to calibrate vision systems of multiple types or sizes of vehicles positioned at said calibration targets.

\* \* \* \* \*

UNITED STATES PATENT AND TRADEMARK OFFICE
CERTIFICATE OF CORRECTION

PATENT NO. : 9,688,200 B2
APPLICATION NO. : 14/195135
DATED : June 27, 2017
INVENTOR(S) : Timor Knudsen It is certified that error appears in the above-identified patent and that said Letters Patent is hereby corrected as shown below:

In the Claims

Column 14
Line 54, Claim 10, "calibrating-procedure" should be --calibrating procedure--

Signed and Sealed this
Thirtieth Day of October, 2018

Andrei Iancu
*Director of the United States Patent and Trademark Office*